US011554776B2

(12) United States Patent
Nagel et al.

(10) Patent No.: US 11,554,776 B2
(45) Date of Patent: Jan. 17, 2023

(54) SYSTEM AND METHOD FOR PREDICTING OF ABSOLUTE AND RELATIVE RISKS FOR CAR ACCIDENTS

(71) Applicant: SWISS REINSURANCE COMPANY LTD., Zurich (CH)

(72) Inventors: Uwe Nagel, Zurich (CH); Ramya Venkateswaran, Dietikon (CH); Peter Larkin, Zurich (CH); Christian Elsasser, Winterthur (CH); Iordanis Chatziprodromou, Zurich (CH)

(73) Assignee: SWISS REINSURANCE COMPANY LTD., Zurich (CH)

( * ) Notice: Subject to any disclaimer, the term of this patent is extended or adjusted under 35 U.S.C. 154(b) by 253 days.

(21) Appl. No.: 16/401,286

(22) Filed: May 2, 2019

(65) Prior Publication Data

US 2019/0325740 A1 Oct. 24, 2019

Related U.S. Application Data

(63) Continuation of application No. PCT/EP2016/076783, filed on Nov. 7, 2016.

(51) Int. Cl.
*B60W 30/095* (2012.01)
*B60W 40/09* (2012.01)
(Continued)

(52) U.S. Cl.
CPC ........ *B60W 30/0956* (2013.01); *B60W 40/04* (2013.01); *B60W 40/06* (2013.01);
(Continued)

(58) Field of Classification Search
CPC .. B60W 30/0956; B60W 40/04; B60W 40/06; B60W 40/09; G06Q 40/08;
(Continued)

(56) References Cited

U.S. PATENT DOCUMENTS

2014/0365246 A1* 12/2014 Hayward ............... G06Q 40/08
705/4
2016/0063516 A1* 3/2016 Terrazas ................ G06V 10/75
705/7.29

(Continued)

*Primary Examiner* — Aniss Chad
*Assistant Examiner* — Stephanie T Su
(74) *Attorney, Agent, or Firm* — Oblon, McClelland, Maier & Neustadt, L.L.P.

(57) ABSTRACT

A system and a method for the determination and forecast of absolute and relative risks for car accidents based on exclusively non-insurance related measuring data and based on automated traffic pattern recognition, wherein data records of accident events are generated and location-dependent probability values for specific accident conditions associated with the risk of car accident are determined. The proposed system provides a grid-based, technically new way of automation of risk-prediction related to motor accidents using environment based factors including socio-economic factors that are impacting motor traffic and are location dependent received from appropriate measuring devices and systems. In this way, predictions of the accident risk for arbitrary areas can be provided. The system is calibrated by comparing features of areas or road segments with the number and type of accidents that have measured or registered there, linking the features and accident data e.g. using the below discussed machine learning techniques.

19 Claims, 17 Drawing Sheets

Figure 1:
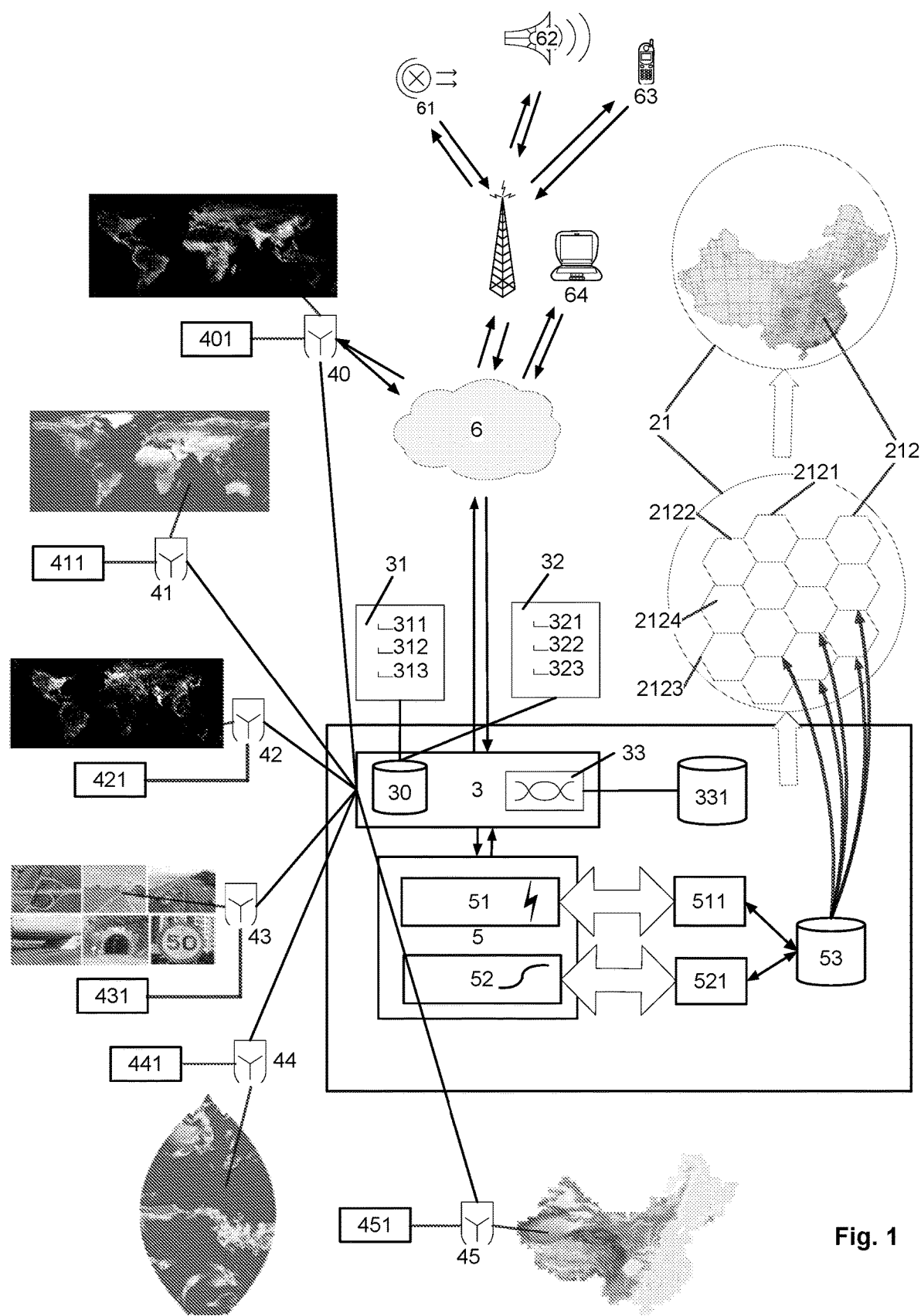

(51) Int. Cl.
*G08G 1/16* (2006.01)
*G08G 1/01* (2006.01)
*B60W 40/04* (2006.01)
*B60W 40/06* (2012.01)
*G06Q 40/08* (2012.01)

(52) U.S. Cl.
CPC ............. *B60W 40/09* (2013.01); *G06Q 40/08* (2013.01); *G08G 1/012* (2013.01); *G08G 1/0112* (2013.01); *G08G 1/0116* (2013.01); *G08G 1/0129* (2013.01); *G08G 1/0133* (2013.01); *G08G 1/164* (2013.01); *G08G 1/166* (2013.01)

(58) Field of Classification Search
CPC .... G08G 1/0112; G08G 1/0116; G08G 1/012; G08G 1/0129; G08G 1/0133; G08G 1/164; G08G 1/166
See application file for complete search history.

(56) References Cited

U.S. PATENT DOCUMENTS

| | | | |
|---|---|---|---|
| 2017/0069214 A1* | 3/2017 | Dupray | G08G 5/0013 |
| 2017/0212992 A1* | 7/2017 | Pah | G06Q 30/0205 |

* cited by examiner

SYSTEM AND METHOD FOR PREDICTING OF ABSOLUTE AND RELATIVE RISKS FOR CAR ACCIDENTS

CROSS-REFERENCE TO RELATED APPLICATIONS

This application is a continuation of PCT Application No. PCT/EP2016/076783, filed Nov. 7, 2016, the entire contents of which are incorporated herein by reference.

FIELD OF THE INVENTION

The present invention relates to a system for predicting and determining absolute and relative risks for car accidents, especially for automated location-dependent risk forecast of car accidents, based on exclusively non-insurance related data. Furthermore, the present invention also generally relates to automated systems and methods for rating and/or performing risk transfers for a vehicle between risk-exposed units and an automated risk transfer unit, such as automated insurance systems. The systems and methods may utilize automated means to gather, capture and process data to determine rating factors for grid locations associated with a geographic area where the vehicle is used. Furthermore, the system may also comprise appropriate means for signal generation and signal transfer to electronically operated and associated systems.

PRIOR ART

Apparatuses and methods for automated traffic or driving pattern recognition and for determining risks associated with driving or traffic patterns are complex and technically difficult or technically impossible (to the point of chaotic behavior of the traffic or driving pattern) to realize with a sufficient degree of accuracy. Apart from determining associated risks, traffic or driving pattern recognition and traffic pattern recognition is also an important part of most modern intelligent transportation systems. Urban transport condition recognition is the basis of intelligent control, guidance, synergy and risk evaluation systems.

There are various approaches to realize such systems in the corresponding field of technology. However, all approaches must somehow establish the at least three-dimensional space with traffic volume, average speed and occupation ratio. Furthermore, there must be a classification of transportation condition patterns, e.g., in terms of blocking flow, crowded flow, steady flow and unhindered flow. The classification can be for example based on historic traffic patterns. To process the data, the systems can compare the classification result of different traffic model functions and thus perform the transport condition pattern recognition for instance via a support vector machine. As result, the determined risk and traffic factors should reflect the characteristics of the traffic conditions. The traffic model functions should at least be able to separate different patterns from traffic flows with high classification accuracy, wherein the data normalization has a significant influence on the result of classification.

It is important to understand that for all those control, guidance, synergy and risk evaluation systems, traffic condition recognition and forecasting is typically based on highly dynamic factors, both in temporal resolution as well as topographical resolution. Though with respect to the temporal dynamic, recognized or forecasted traffic risk factors can be associated with a wider temporal frame, e.g., one day, one month or one year, it is clear that the dynamics of traffic risk factors are directly correlated to the dynamics of the traffic condition pattern, wherein the risk factors are averaged over the evaluated time frame.

Risk transfer in insurance technology, especially for appropriate underwriting processing during the risk transfer, comprises the process of assessing the value of a given risk, and in turn determining monetary resources, typically to be transferred in a periodic time frame, to protect against the possibility of the occurrence of a risk event associated with the transferred risk. To ensure operational stability of the risk transfer system, i.e., the insurance system, the transferred resources are defined to reflect the amount of a payout, if a covered event occurs, in view of the likelihood of the occurrence of that event. The process of determining the amount of resources to be transferred is called rating. The rating process may include a number of variables, including experience data for a specific insured entity, experience data for a class of insured entities, capital investment predictions, profit margin targets, and a wide variety of other data useful for predicting the occurrence of certain real-world events as well as the amount of damage likely to result from such events.

The process of historical or experience rating involves analyzing past claims experience to determine a prospective amount of resources (e.g., aggregated premiums) and/or a retrospective amount of resources adjustment. For example, a risk-exposed unit may operate a large fleet of vehicles, wherein that risk-exposed unit may seek to transfer the vehicle's risk to cover property damage and to cover possible personal injury claims if a fleet vehicle were to be in an accident with another vehicle. If the fleet is large enough or the risk-exposed unit has been operating the fleet long enough, there may be enough historical data to reliably and accurately estimate the expected claims for the next year. That estimate (possibly combined with an allocation of expenses or assessment of an administrative fee) would represent the transferred monetary resources, e.g., the insurance premium, in an ideal scenario. At the end of the annual policy term, a surcharge or refund may also be appropriate if the actual claims for the term were higher or lower than the estimated claims amount.

Automated systems for determining the amount of resources to be pooled to balance appropriate risk transfer for a vehicle, e.g., an insurance premium, can for example include the steps of (i) receiving driving information collected by using an acceleration sensor included in one or a plurality of vehicles, (ii) recognizing a driving and/or traffic pattern about an accident risk among the driving habits of the vehicle drivers from the inputted driving and/or traffic information, and finally (iii) determining the insurance premium in proportion to the accident risk rate of the drivers based on the recognized traffic and/or driving pattern.

However, the risk transfer for a typical automobile cannot produce anywhere near the amount of data needed to make a reliable and accurate estimate of anticipated claims for the vehicle or vehicles. Thus, automated insurance systems must typically try to rate specific risk transfers, i.e., specific policies, in a risk pool of comparable policies to produce enough data to make such an estimate. One mechanism for doing this is to assess what data is available for a specific vehicle (e.g., demographic information, types of vehicles, and what limited risk transfer, i.e., claim, information is available) and use that data to assign an appropriate pool of resources to the specific vehicle. The various types of data available to an automated risk transfer system for performing the rating process are often associated with geographic locations or regions. However, this association is not consistent or uniform. Some property crime data is associated with a "block" of addresses on a city street, e.g., 300-400 block of Main Street. Road zone data and land elevation data may be stored as complex topographic maps. Loss experience data may be associated with a coordinate pair representing the longitude and latitude of the location of the loss event.

In the prior art systems, risk transfer rating requires a complex search process to compile relevant data for input into a rating function. For example, a risk transfer for a specific vehicle to be rated may be associated with a specific location, e.g., a street address of a home or office or the location where a vehicle will be parked at night. To rate a policy for that location, some subset of the relevant data must be gathered and provided to a rating algorithm. The gathering process is often technically difficult in view of the inconsistent and non-uniform associations of data to geography discussed above. In some instances, data is processed and aggregated by county, city, and/or postal ZIP code. This aggregation is made difficult by the nearly arbitrary boundaries defined by county lines, city limits, and ZIP codes. Furthermore, county, city, and postal ZIP code boundaries may change over time. In other instances, data is processed by aggregated sales territory.

Furthermore, in the prior art, rates assigned to each area are generally determined based on the associated historical claims experience. While existing territorial rating methods have been used in prior art risk transfer systems, these approaches can be problematic for several reasons: (i) geographic boundaries can change, as discussed above; (ii) geographic areas may be larger than desired; (iii) populations may not be equally distributed within these geographic areas; (iv) historical claim experience within these geographic areas may be limited; and (v) where a vehicle is garaged does not accurately measure geographic risk of where the vehicle is used.

SUMMARY OF THE INVENTION

It is one object of the present invention to provide a system and method for sharing the risk of risk events of a variable number of risk exposure components by providing dynamic, self-sufficient risk protection for the risk exposure components covering different risks and risk categories, which does not have the aforementioned drawbacks. In particular, it is meant to be possible to provide an apparatus and method for automated traffic and/or driving pattern recognition and for determining risks associated with driving or traffic pattern with a high degree of temporal and spatial resolution, especially for regions where the amount of accessible historical data is small or even nonexistent.

The present invention achieves this aim particularly by means of the elements of the independent claims. Further advantageous embodiments can also be found in the dependent claims and the description.

In particular, these aims are achieved by the invention in that for the system for automated location-dependent forecast of absolute and relative risks for car accidents based on exclusively non-insurance related data, data records of accident events are generated and location-dependent probability values for specific accident conditions associated with the risk of car accident are determined, in that a spatial high-resolution grid with grid cells is generated over a geographical area of interest by means of a capturing unit, said area including at least a portion of units exposed to accident risks, wherein the grid cells of the grid are selectable and data are assignable by means of the system to each cell of the grid, and wherein data records representative of a grid cell are assigned to an occurrence or measuring year and are saved on a memory module of a calculating unit, in that for each grid cell an ambient population density parameter is captured by means of a settlement pattern trigger and assigned to a generated data record assigned to the corresponding grid cells, wherein population density parameters are captured for the geographical area of interest and customized weighting factors are assigned in said spatial high-resolution grid accounting for the diverse settlement patterns, in that first measured aerial high-resolution data captured by first air-based measuring stations are transferred to the system and land cover parameters are generated and stored by means of the generated data record assigned to the corresponding grid cells based on said first aerial high-resolution data, wherein the land cover parameters are a measure for the observable bio-physical cover on the earth's surface, in that second high-resolution data on light density captured by second air-based measuring stations are transferred to the system and nighttime light parameters are generated and stored by means of the generated data record assigned to the corresponding grid cells based on said second aerial high-resolution data on light density, wherein said nighttime light parameters are generated based on their weighted proxy for local activity and correlation to other welfare proxy measures, in that third high-resolution data captured by systematically running ground survey measuring stations are transferred to the system and road map parameters are generated and stored by means of the generated data record assigned to the corresponding grid cells based on said third high-resolution data of ground survey measuring stations, wherein the road map parameters comprise at least one classification parameter indicating a type of the assigned road, in that fourth measured aerial high-resolution data captured by air-based measuring stations are transferred to the system and precipitation parameters are generated and stored by means of the generated data record assigned to the corresponding grid cells based on said fourth aerial high-resolution data, wherein the generated precipitation parameters comprise a measure of the hydrological cycle giving at least the local precipitation distribution, amounts and intensity at a specific point or area of the corresponding grid cell, in that fifth measured aerial high-resolution data captured by fourth air-based and/or space-based measuring stations are transferred to the system and digital elevation parameters are generated and stored by means of the generated data record assigned to the corresponding grid cells based on said fifth aerial high-resolution data, wherein the generated digital elevation parameters comprise a measure for the terrain elevation at a specific point or area of the corresponding grid cell providing a representation of the terrain's surface, in that the system comprises a trigger module with a hash table with a plurality of selectable morphological traffic model-functions, wherein for each grid cell, the generated data records are filtered by predefined trigger parameters triggering threshold values of the generated population density parameters, the land cover parameters, the nighttime light parameters, the road map parameters, the precipitation parameters, and the digital elevation parameters, wherein the morphological traffic model-functions are matched by means of a scaling table based on captured actual accident data, and wherein a specific morphological traffic model-function is triggered and selected by best matching to the accident data, and in that a risk-value field for each of the grid cells is generated by means of an interpolation module based on the data records associated with the specific grid cell, and a probability is assigned by means of the interpolation module to each point in said grid, giving the probability of the occurrence of an accident at a given geographical location and time.

The present system provides, inter alia, a technically new way of automation of risk-prediction related to motor accidents using environment based factors (elevation, road network, traffic data, weather conditions) including socio-economic factors that are impacting motor traffic and are location dependent. In this way, predictions of the accident risk for arbitrary areas can be generated. The corresponding data are extracted from satellite-based raster data or road network data collected via remote sensing techniques as well as ground survey. They are then either aggregated according to administrative areas or areas that are defined by an arbitrary raster or they are aggregated on a road-segment level capturing the environmental situation (population density, number of roads close by, etc.) around a certain road segment. In this aggregation, features are constructed from the underlying data that are representing aspects of the environment that are relevant to the motor accident risk (e.g. number of junctions). The system is calibrated by comparing the features of the areas or road segments with the number and type of accidents that have happened there and linking the features and accident data e.g. using the below discussed machine learning techniques. The type of accidents represents the severity of the accidents described as number of insured and killed people involved the accident, the accident geometry (rear-ending, t-bone, frontal collision, glancing collision), the number of involved cars or the damage classification. The output signaling of the system can e.g. be as a function with values for the different features as input and accident risk parameters (e.g. accident frequency and severity) as output. By comparing risk-transfer data (client portfolio data and/or market portfolio data) the different severity metrics can also be translated or transferred into monetary values representing the average loss amount per accidents for different lines of businesses.

In one alternative embodiment, the aerial high-resolution data comprise aerial images and/or satellite images and/or aerophotos. The aerial high-resolution data can for example also comprise aerial images and/or satellite images and/or aerophotos measured by satellite and/or aircraft and/or aerostat or other measuring stations equipped with a balloon.

In another alternative embodiment, the proxy for other welfare proxy measures comprise highly localized human well-being measures and/or national or sub-national Gross Domestic Product (GDP) measures, whereas the proxy is used as a weighting parameters of the system.

In a further alternative embodiment, the third high-resolution data are selected by means of a data extraction from an accessible high-resolution road map database.

In an alternative embodiment, the ground survey measuring stations comprise a GPS-unit (Global Positioning System) or are traceable by satellite imagery. Each parameter can e.g. be clustered, wherein the combination of them is translated into a meaningful class, e.g. motorway, footway, etc. The classification of the road map parameters can for example comprise values to classify cycleways, footways, motorways, paths, pedestrians, primary roads, residential roads, secondary roads, steps, services, tertiary roads tracks and/or unclassifiable street objects.

In another alternative embodiment, the classification parameters comprise tag elements allowing for attributes of the classification. The classification parameters can for instance also comprise a measure for an average speed of a traffic member at the specific point of the grid cell.

In an alternative embodiment, the precipitation parameters comprise at least parameters measuring the precipitation of rain and/or snow and/or hail.

Finally, in yet another alternative embodiment, the digital elevation parameters further comprise morphological elements.

It should be stated that the present invention relates not only to the inventive method, but also to a system for carrying out this method and a corresponding computer program product.

Alternative embodiments of the present invention are described below with reference to examples. The examples of the embodiments are illustrated by the following appended figures:

FIG. 1 shows a block diagram which schematically illustrates an exemplary embodiment of a system 1 for automated location-dependent forecast of absolute and relative risks for car accidents based on exclusively non-insurance related data. Data records of accident events are generated and location-dependent probability values for specific accident conditions associated with the risk of car accident are determined. A spatial high-resolution grid 212 with grid cells 2121, 2122, 2123, 2124 is generated over a geographical area 21 of interest by means of a capturing unit 2. The geographical area 21 includes at least a portion of units 70-74 exposed to accident risks, wherein the grid cells 2121, 2122, 2123, 2124 of the grid 212 are selectable and data are assignable via the system to each cell 2121, 2122, 2123, 2124 of the grid 212.

Figure 2:
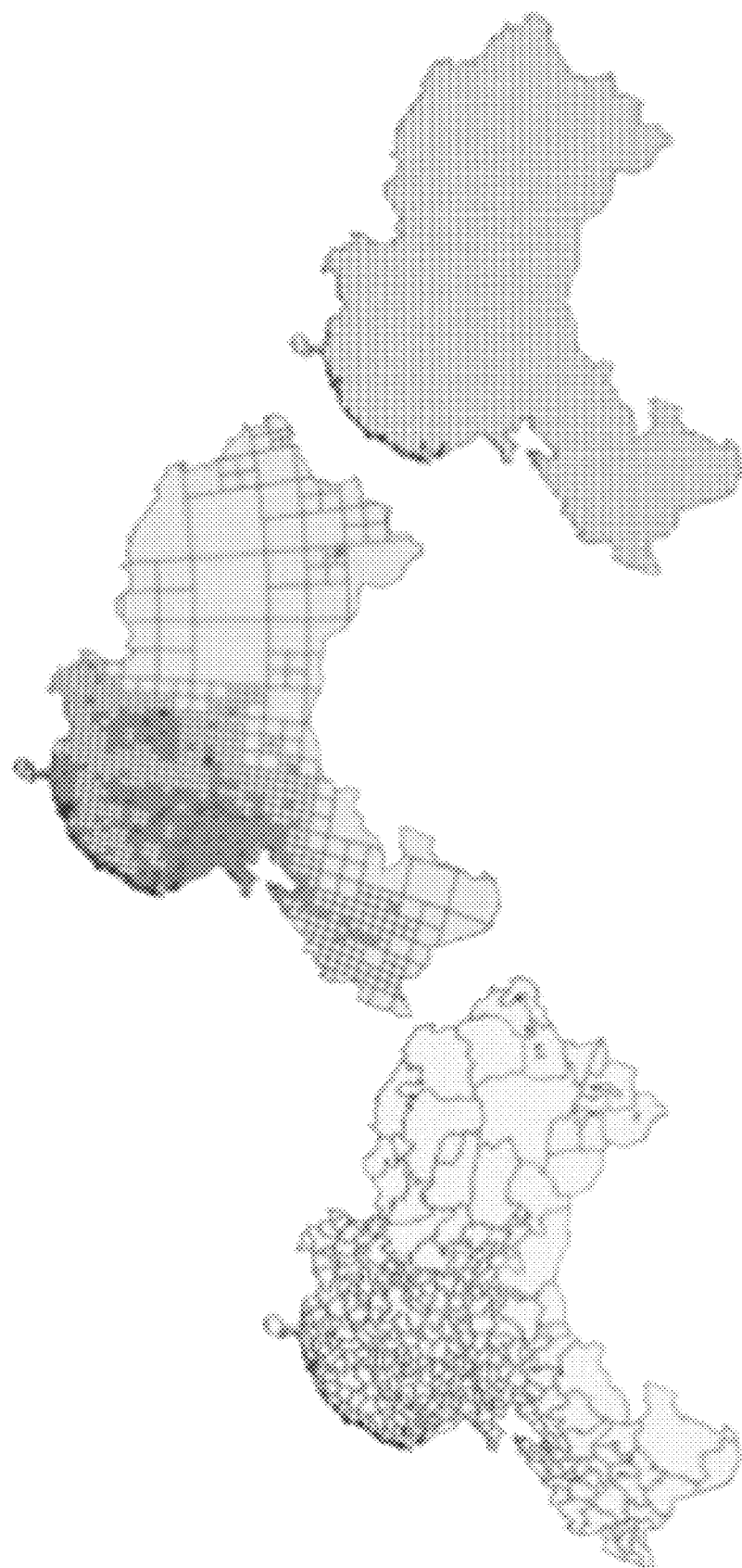
Figure 3:
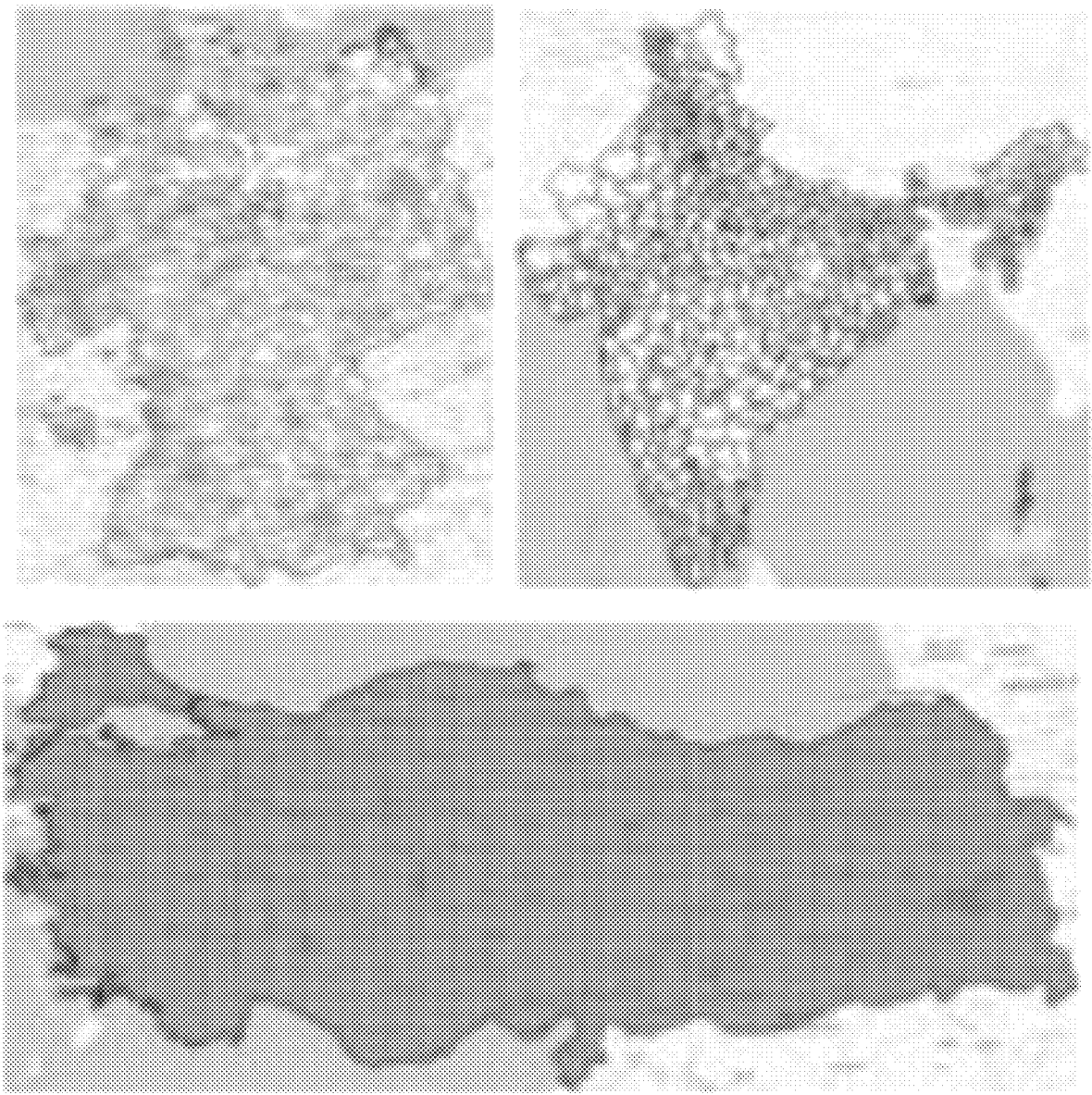

FIGS. 2 and 3 show diagrams, which schematically show the location and resolution of datasets. The figures show as example the data extraction and grid generation for the exemplary countries China, Germany, India, and Turkey. The resolution can be adapted based on dynamic triggered levels, such as municipality and district grids: 2*2, 4*4, 10*10, 15*15 km grids. The grids also can be chosen otherwise, e.g. depending on the available data quality or resolution. An appropriate quadtree data structure can be calculated and associated with the processing steps by the system 1 from the population density parameters. However, for equidistant and equal sized grid cells, quadtree data structures are not used or necessary.

Figure 4:
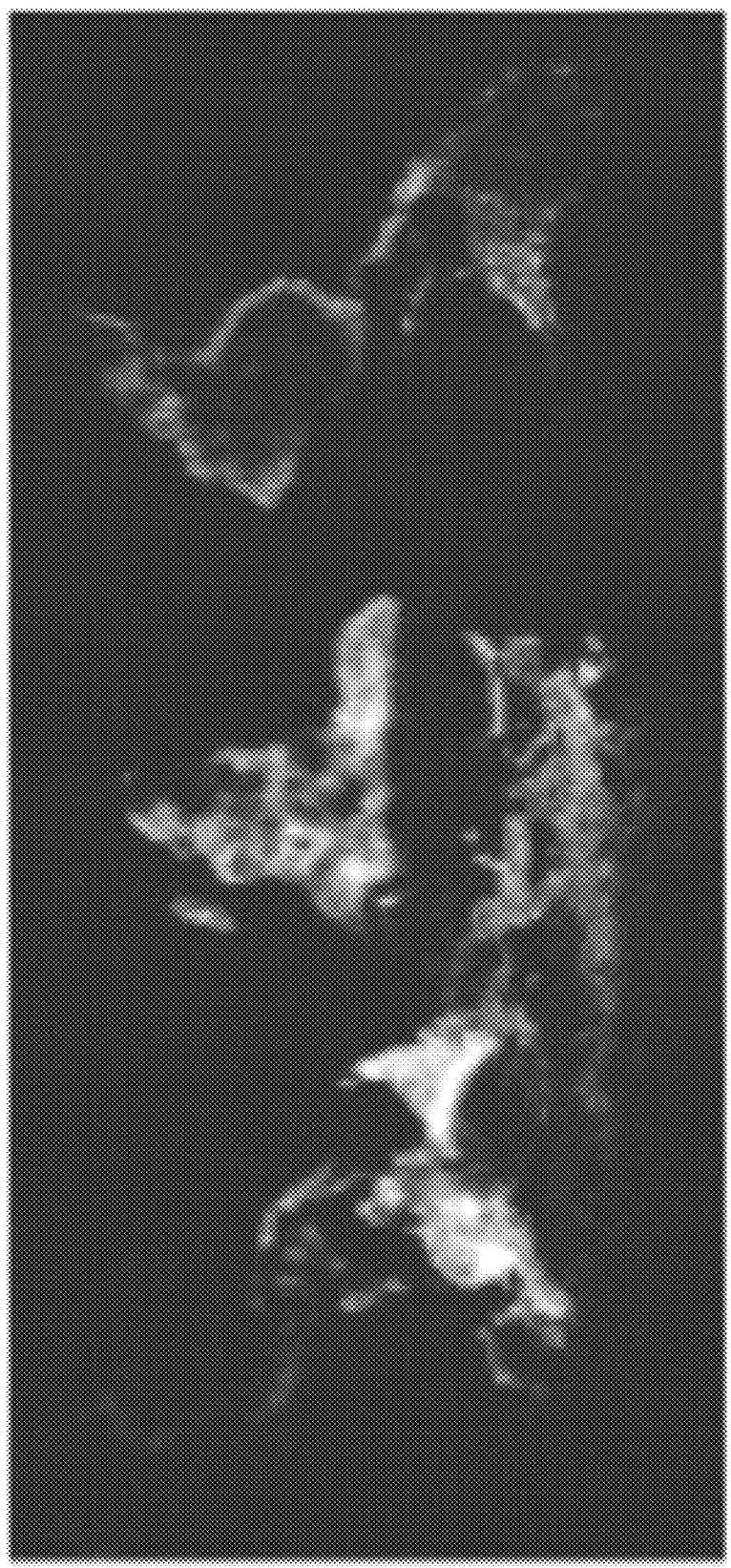

FIG. 4 shows a diagram, which schematically shows a raster of population data 401. The system 1 extracts population density parameters, standard deviation and/or further parameters, such as biomass parameters and/or land use parameters (e.g. commercial, residential, etc.) and/or land cover parameters (agricultural, urban, lake etc.). The weighting factors are generated based on the extracted population density parameters.

Figure 5:

FIG. 5 shows a diagram, which schematically shows the image processing of first aerial high-resolution data 411, i.e., satellite images of land cover data, measured by first air-based measuring stations 41. The first aerial high-resolution data 411 are transferred to the system 1 and land cover parameters are generated by means of system 1, i.e., the system 1 generates defined areas of forest, rural, urban, crop lands, etc.

Figure 6:
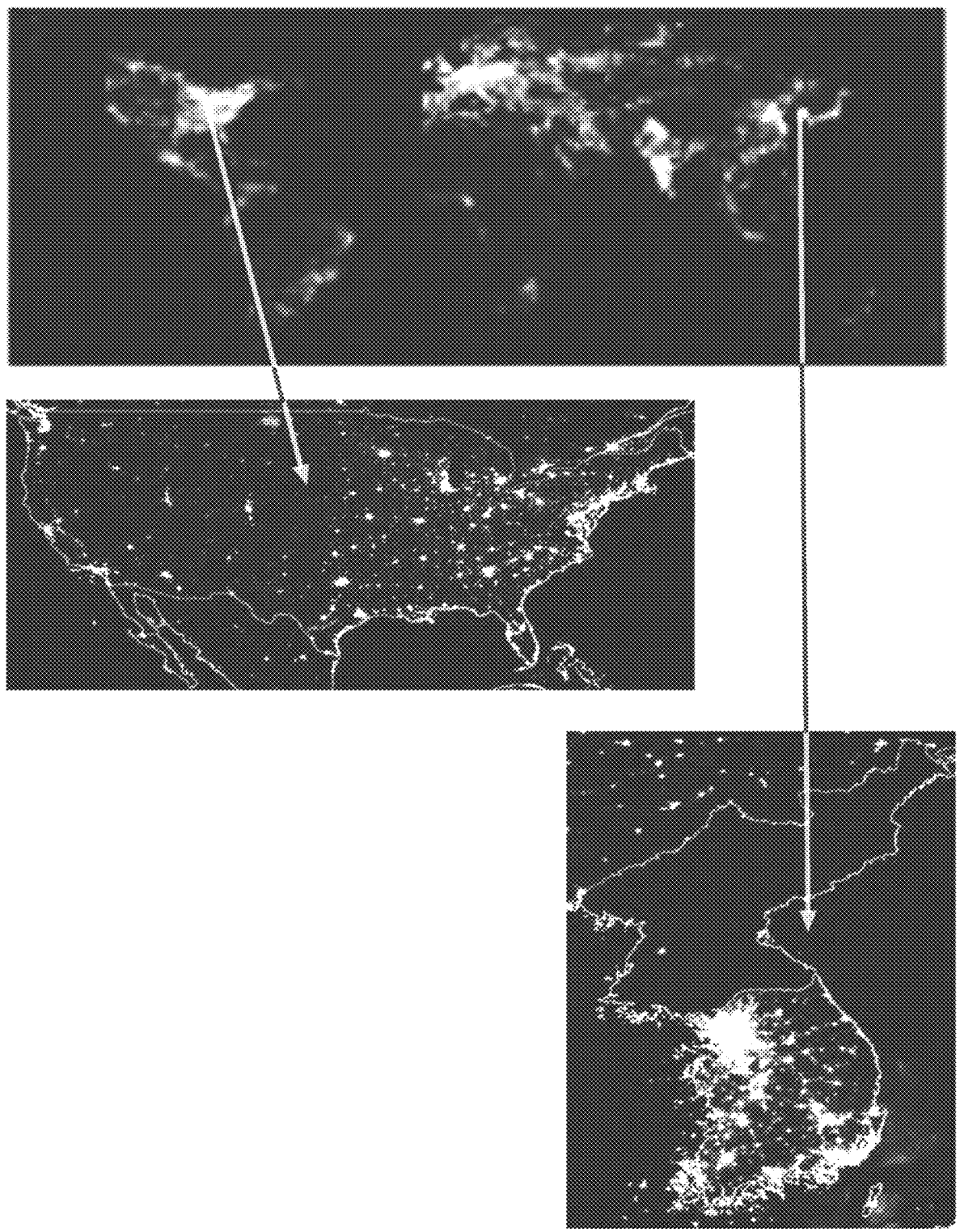

FIG. 6 shows a diagram, which schematically shows the image processing of satellite images of nighttime light data, wherein nighttime light values give a proxy measure of Human Well-Being such as GDP (Gross Domestic Product).

Figure 7:
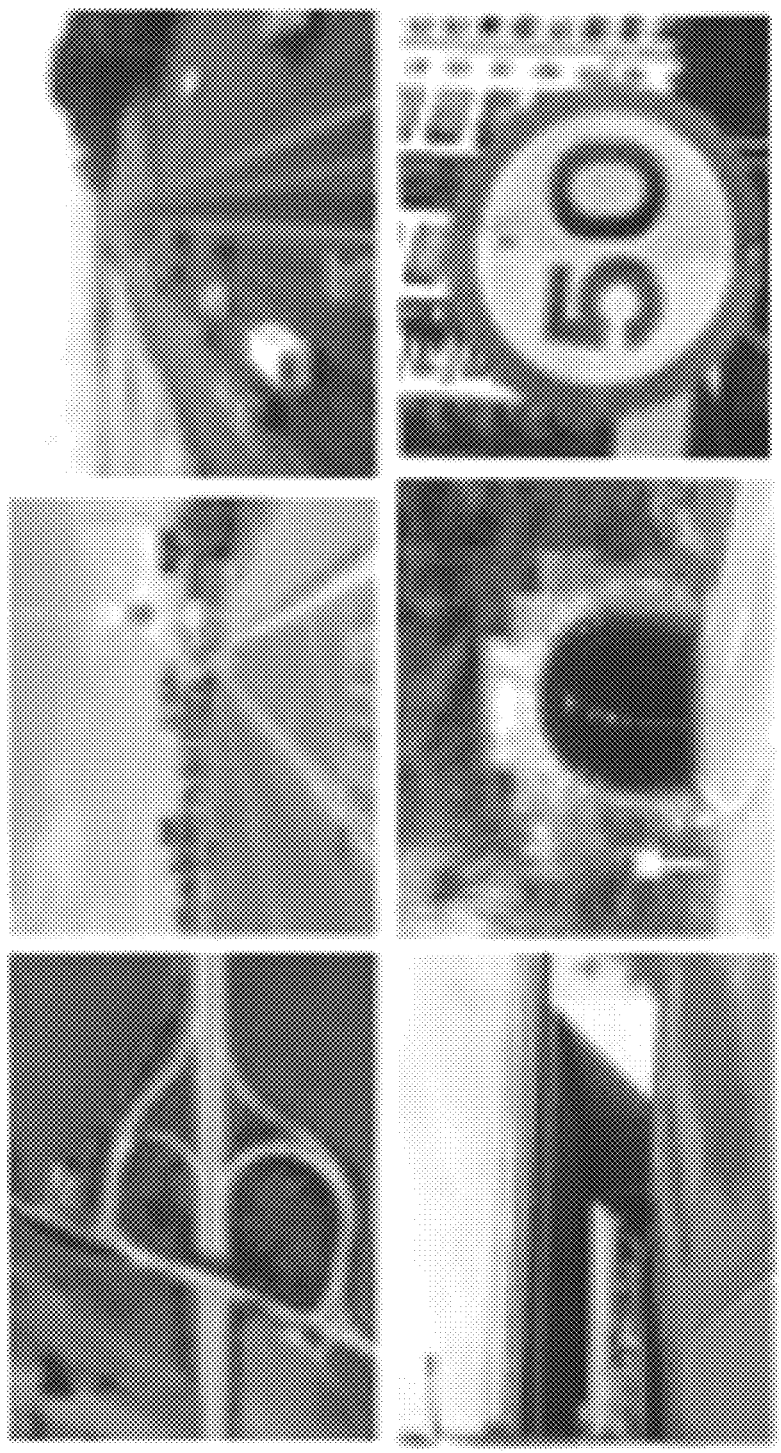

FIG. 7 shows a diagram, which schematically shows the data extraction from map data, road type, length and characteristics, e.g., highways, primary roads, trunk roads, pedestrian roads, etc., road junctions, one ways, tunnels, bridges and speed limits. The dynamically-adapted map data can be based on measuring devices associated with system 1. However, it can also be based on accessing dedicated high-resolution map data, such as OpenStreetMap (OSM) data resources. The aforementioned OSM data example performs data capturing dynamically with a huge number of independent users (currently over 2 million) collecting data using manual survey, GPS devices, aerial photography and other free sources. These data are structured as crowd-sourced data accessible under open database access.

Figure 8:
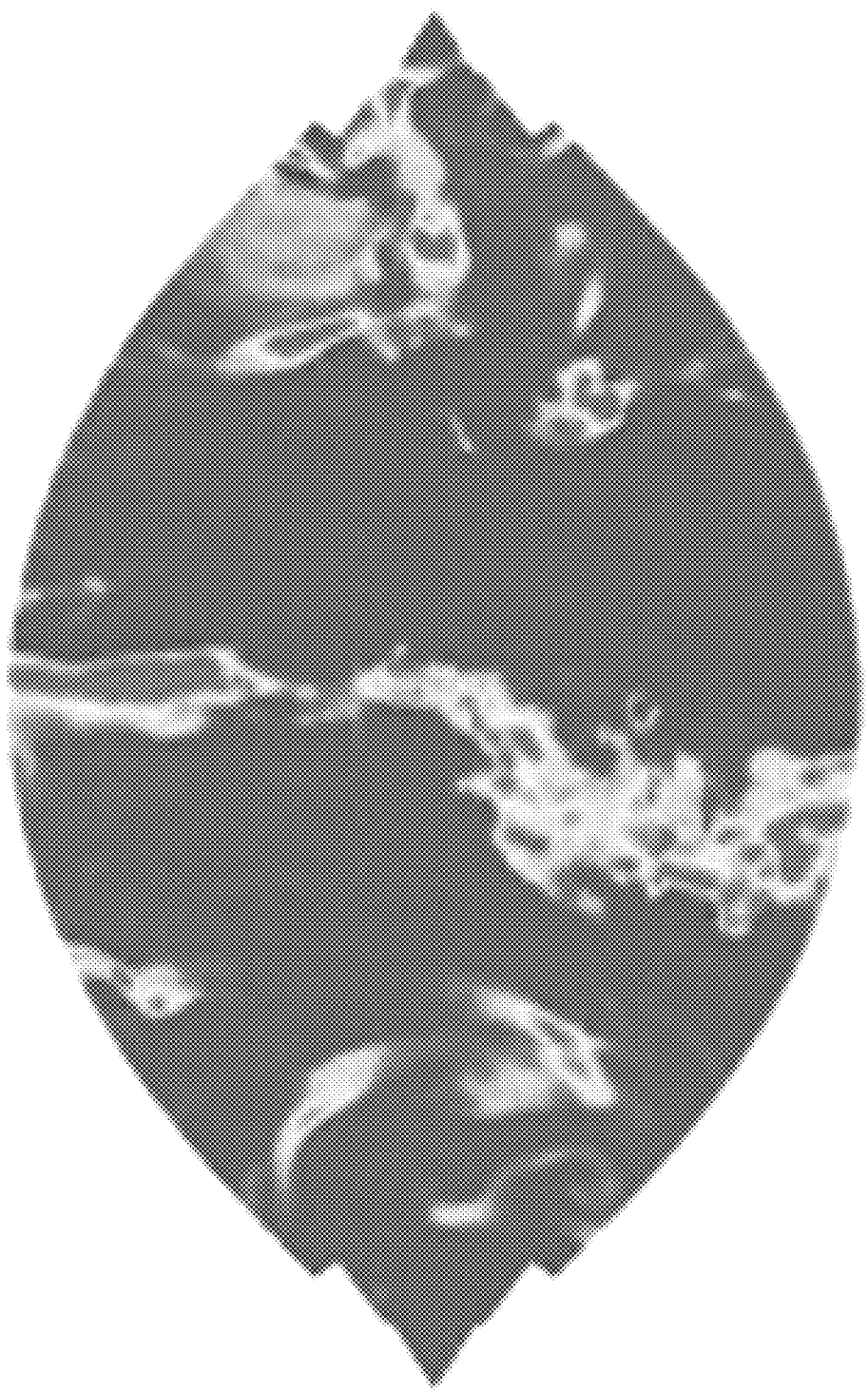

FIG. 8 shows a diagram, which schematically shows the generation and extraction of the precipitation parameters and image processing of the fourth aerial high-resolution data 441, e.g., satellite images of precipitation data, providing precipitation parameters for at least average yearly rainfall and total rainfall. The precipitation parameters are stored by means of the generated data records, which are assigned to the corresponding grid cells 2121, 2122, 2123, 2124.

Figure 9:

FIG. 9 shows a diagram, which schematically shows the generation and extraction of the digital elevation parameters and the image processing of fifth aerial high-resolution data 451, e.g., satellite images, wherein maximum elevation, standard deviation for elevation and mean elevation parameters are generated.

Figure 10:
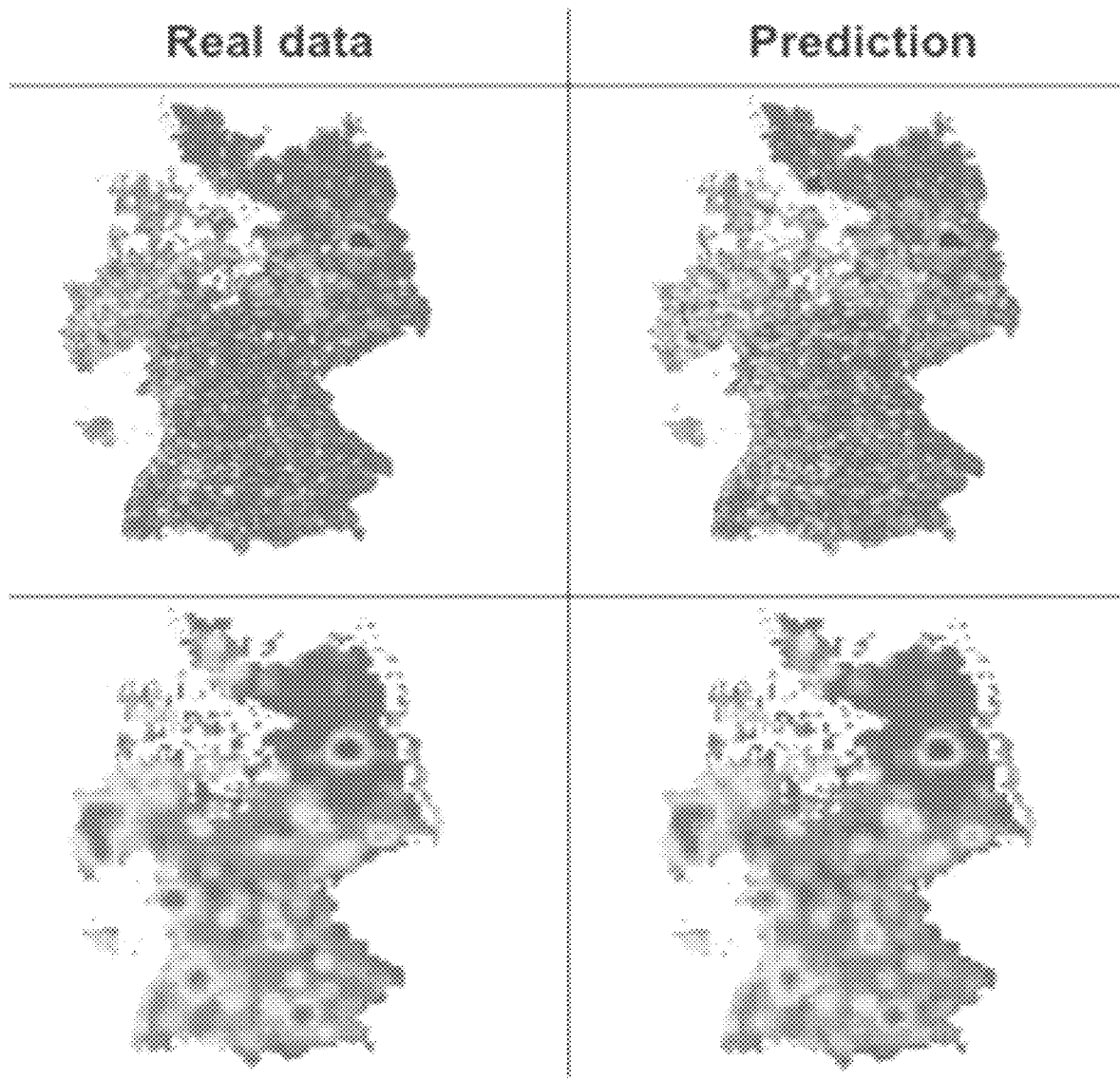

FIG. 10 shows a diagram, which schematically illustrates the improvement to country modeling according to the present invention. The upper two pictures of FIG. 10 are municipality-based, wherein 26% is predicted within an error margin of 20%. The lower two pictures are grid-based, wherein 87% is predicted within an error margin of 20%.

Figure 11:
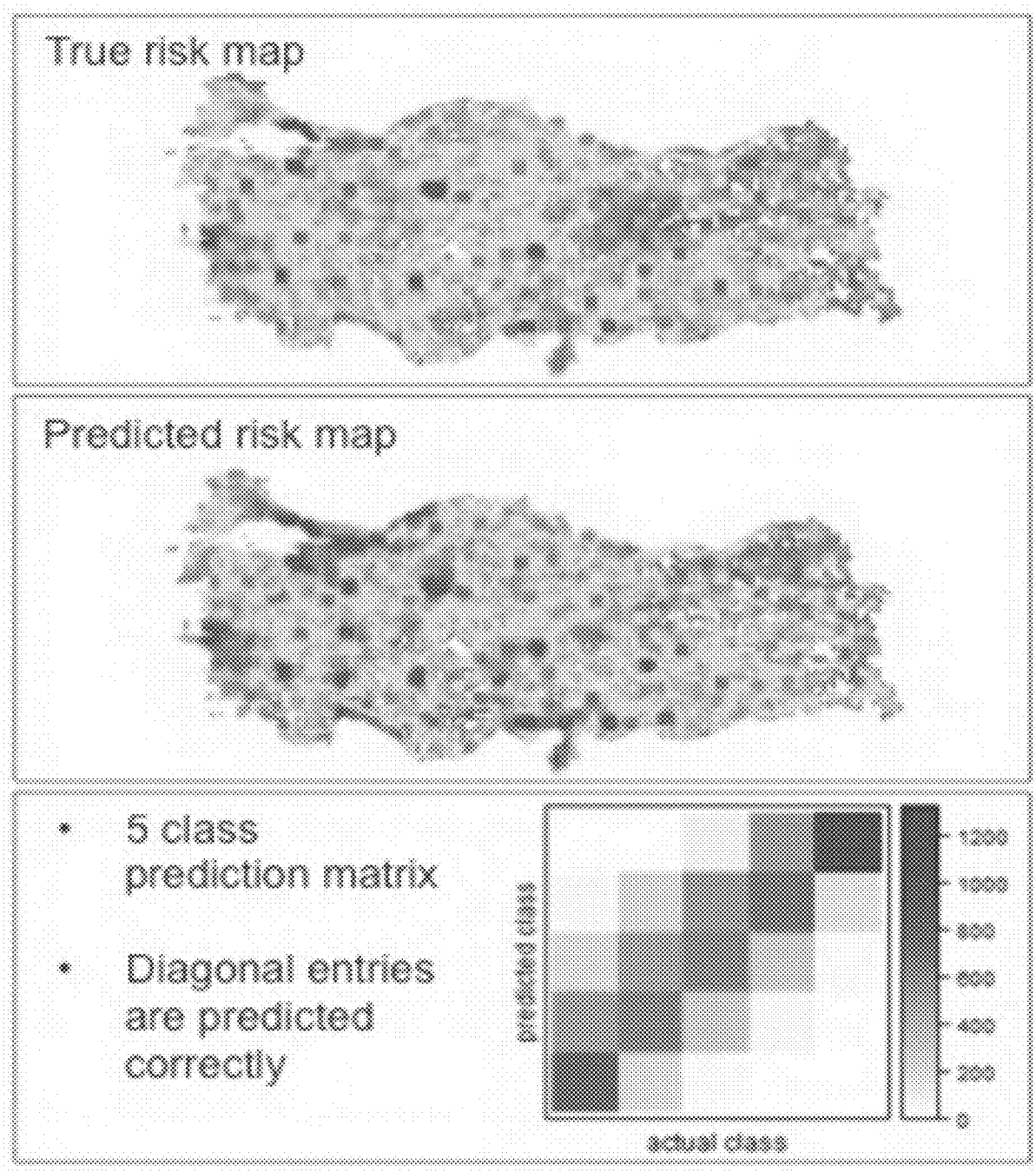

FIG. 11 shows a diagram, which schematically illustrates the calibration and transfer mechanisms of the system 1, shown on the example of predicting accidents in Turkey with a model trained on Germany. The prediction or forecast, i.e., the data processing, is based on accident data for Germany. This prediction employs features for Turkey also available for China. For the example with preliminary transfer efforts, an error of 3%-20% is achieved, and a 96% correlation between prediction and true values. Overall trends are well captured, and a good separation of high/low risk regions is achieved.

Figure 12:
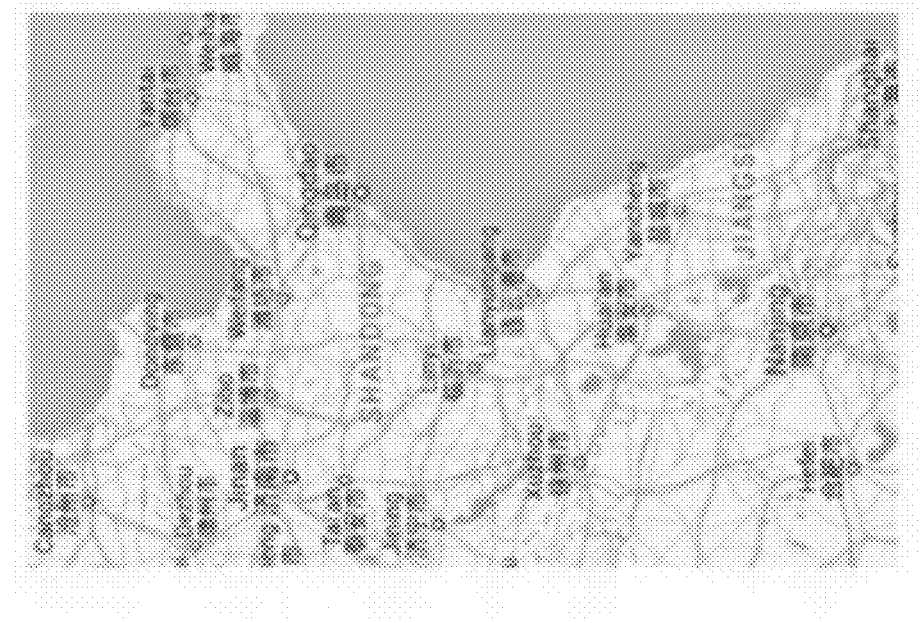
Figure 12:
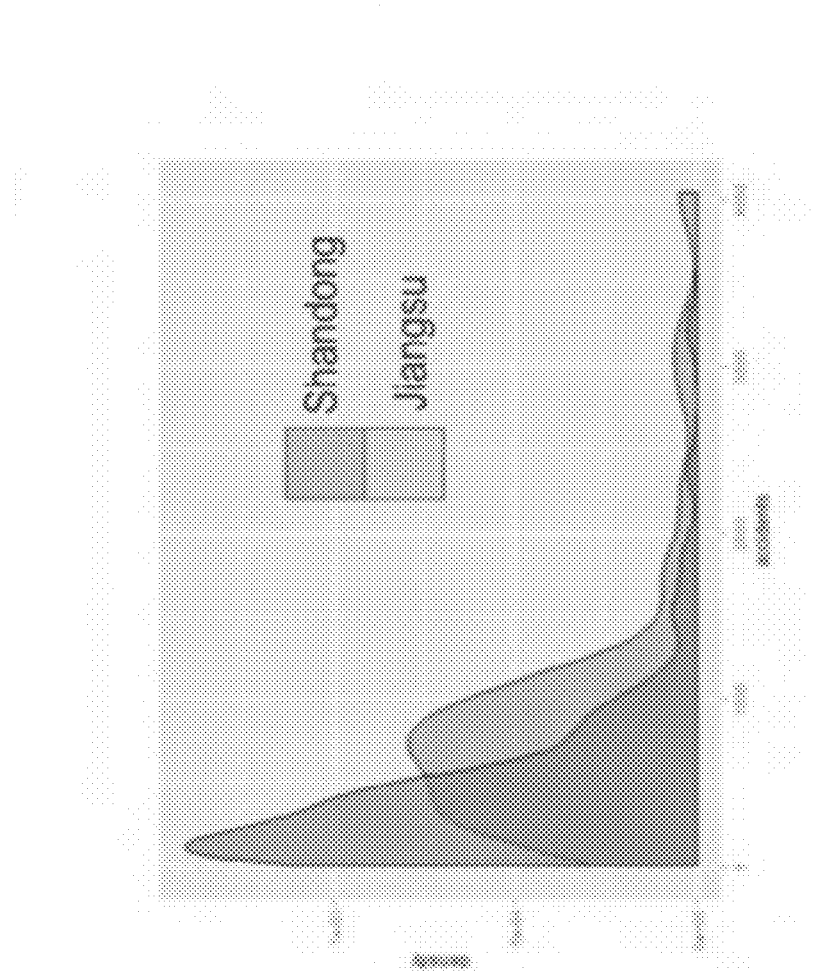

FIG. 12 shows a diagram, which schematically illustrates a risk analysis by the present system for the Jiangsu and Shandong provinces in China. The model applied to China provides an estimate of the number of accidents for different regions. FIG. 12 shows the predicted accident distributions for the two provinces, Jiangsu and Shandong.

Figure 13:
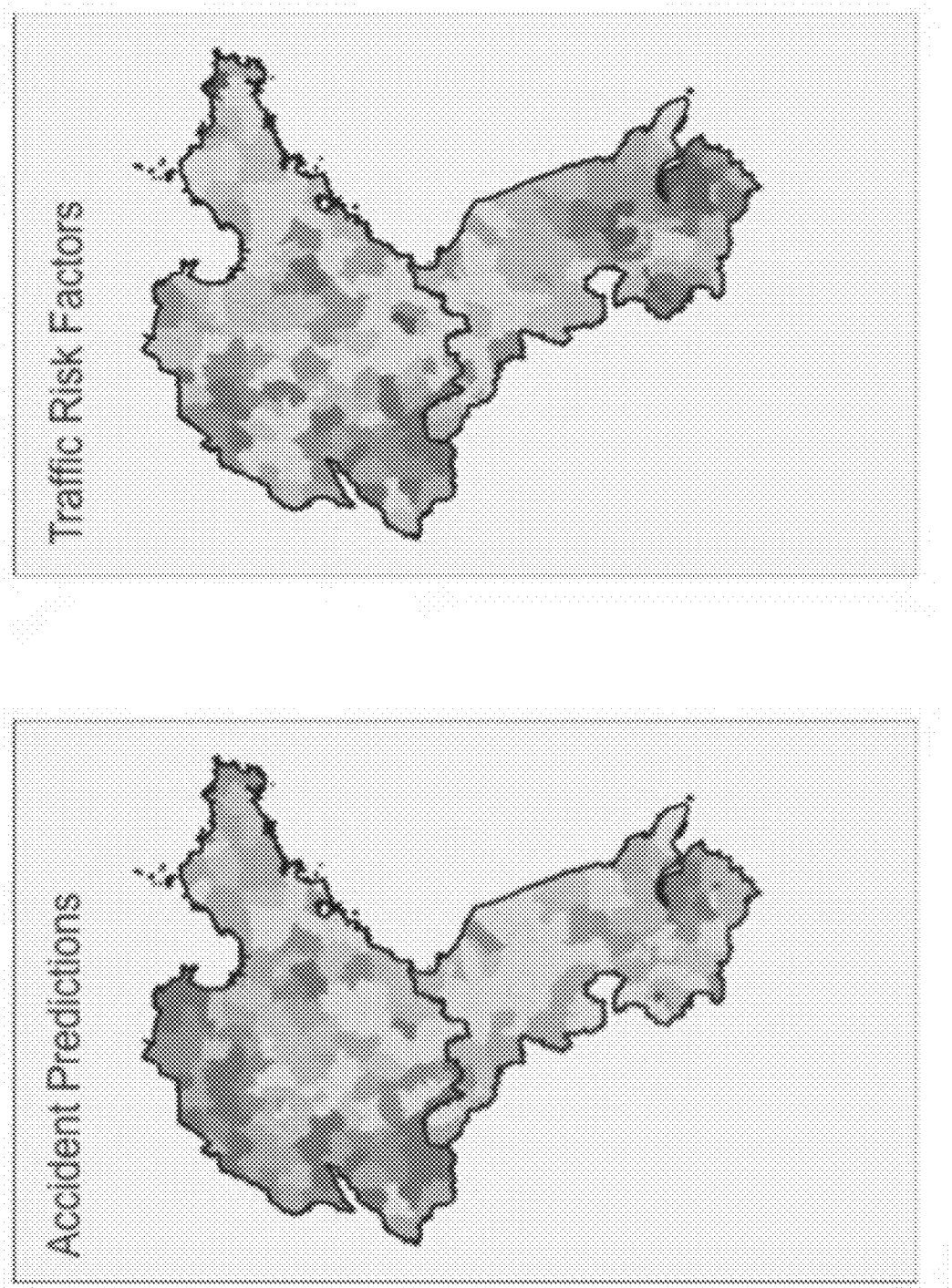

FIG. 13 shows a diagram, which schematically illustrates a comparison of the full model with the traffic risk factors. The present invention is grouping the risk factors by those which give a measure of traffic risk, i.e., motorways, residential streets, bridges and tunnels. Thus, FIG. 13 shows the accident prediction and percentage contribution from traffic risk factors. Areas with more traffic flow, as measured by these traffic risk factors, tend to have a higher accident prediction level.

Figure 14:
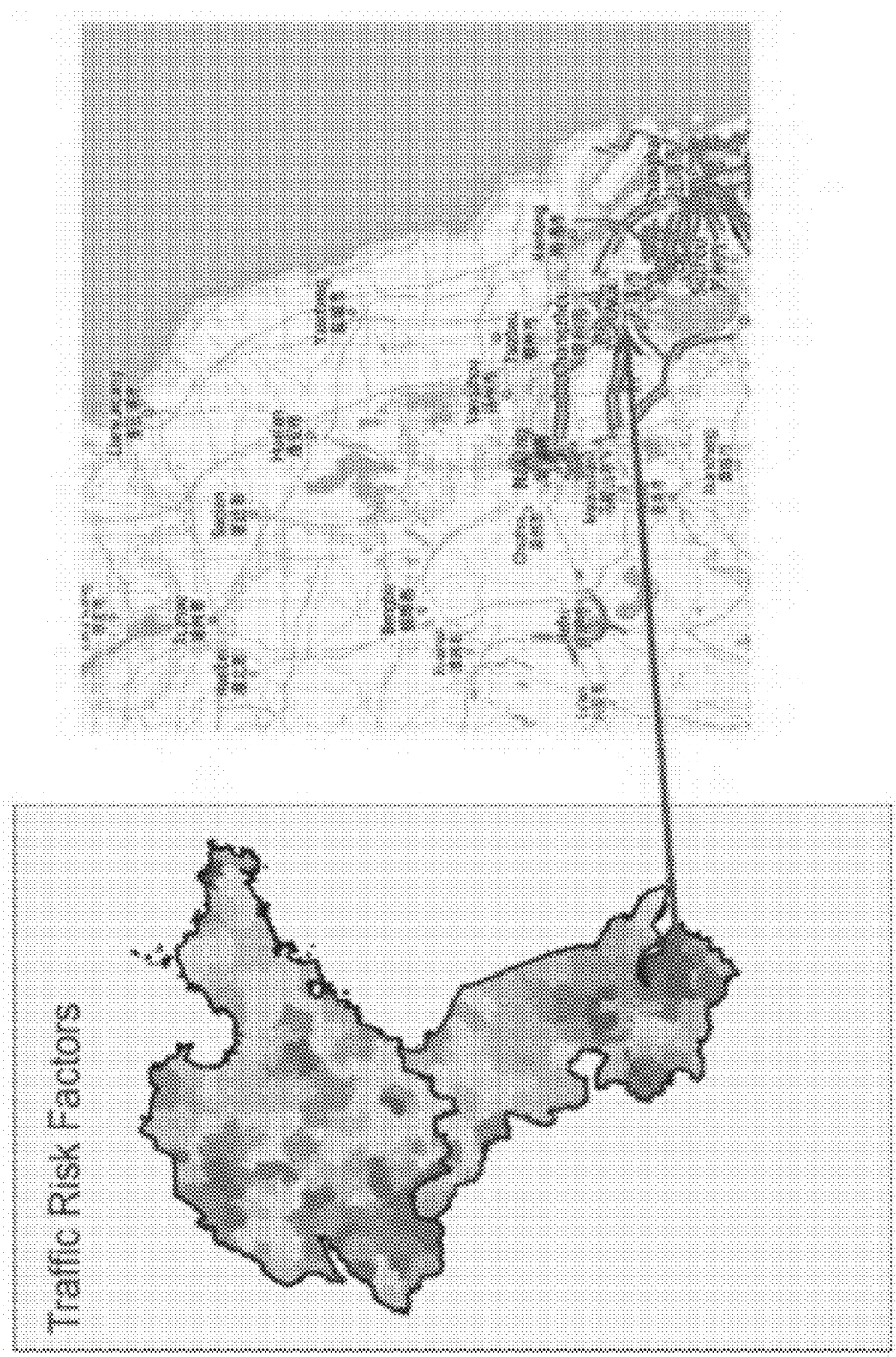

FIG. 14 shows a diagram, which schematically illustrates a comparison of traffic risk factors with traffic flow data. FIG. 14 shows, in the traffic flow data, that the neighboring Shanghai has a large impact on the south of Jiangsu province. The traffic risk factors show a good measure of this traffic flow data.

Figure 15:
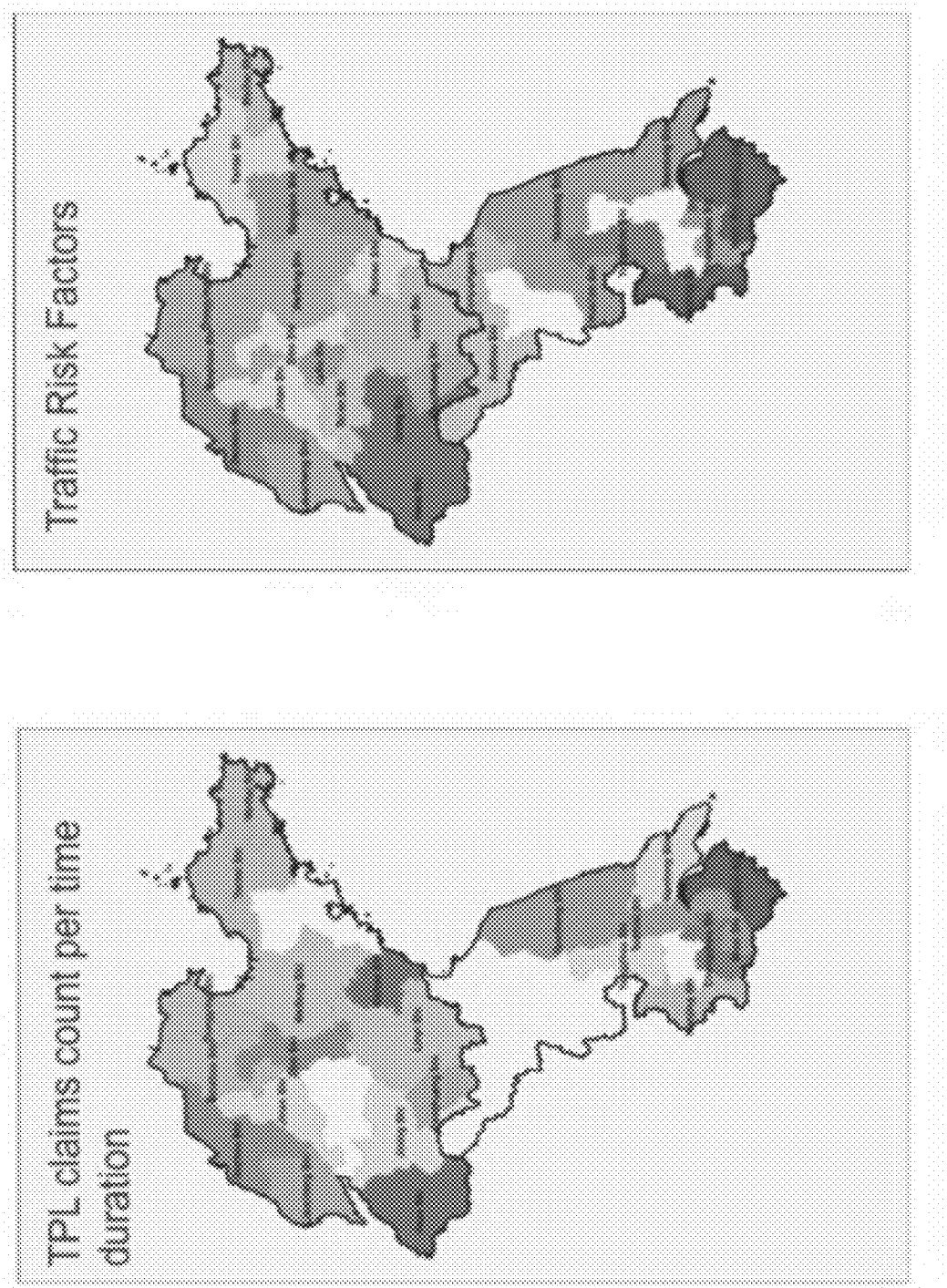

FIG. 15 shows a diagram, which schematically illustrates Third-Party Liability (TPL) claims in comparison to traffic risk factors. The TPL claims are given by count per time duration (left figure), allowing for a direct comparison to the traffic risks.

Figure 16:
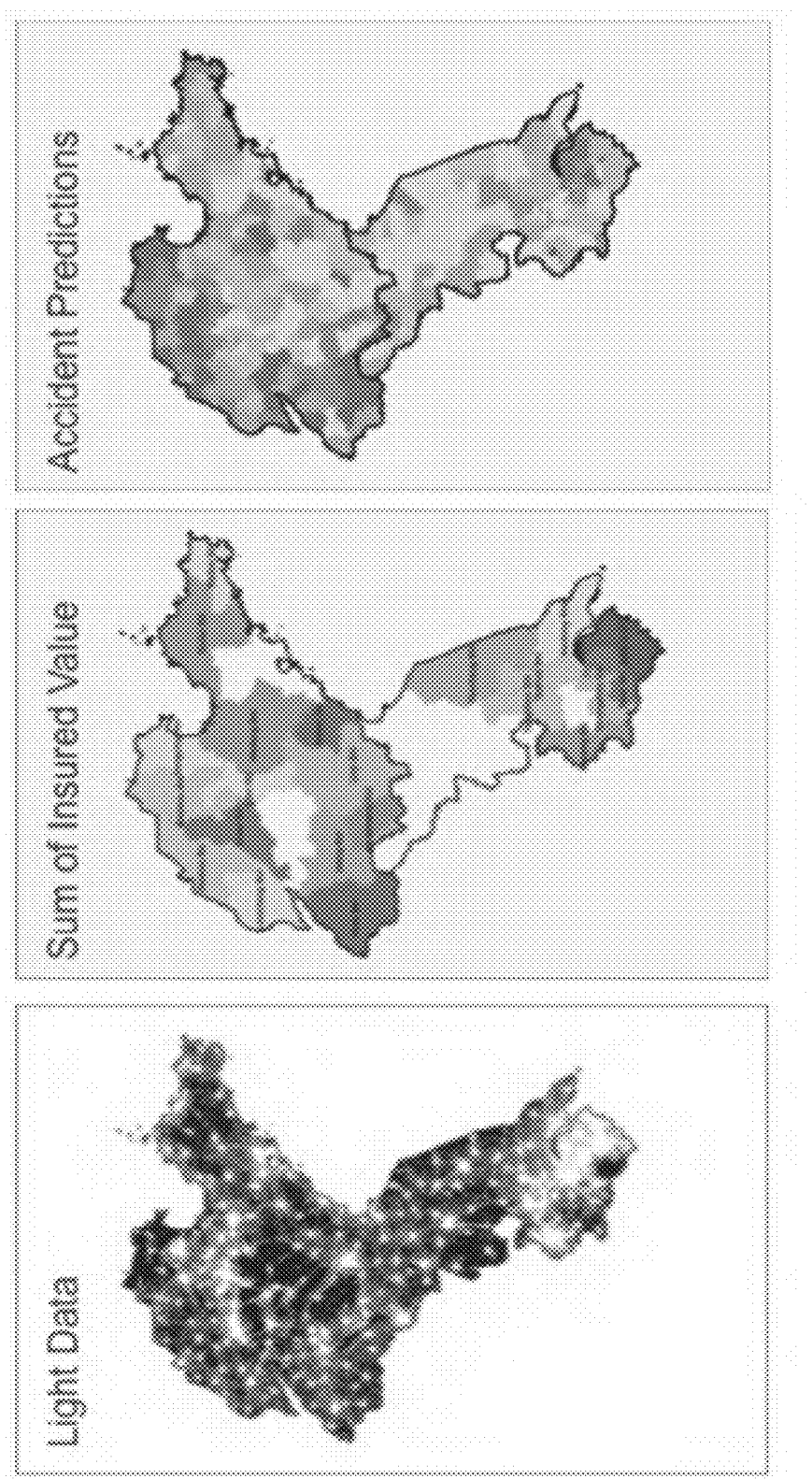

FIG. 16 shows a diagram, which schematically illustrates the processing of the second high-resolution data 421 on light density, i.e., light data according to the invention. The left figure shows the second high-resolution data 421 on light density, while the right figure shows the predicted or forecasted accident risks. The middle figure shows a possible portfolio of transferred risks. As seen from picture 16, the present invention also allows for optimization of associated risk transfer portfolios associated with a geographical area 21.

Figure 17:
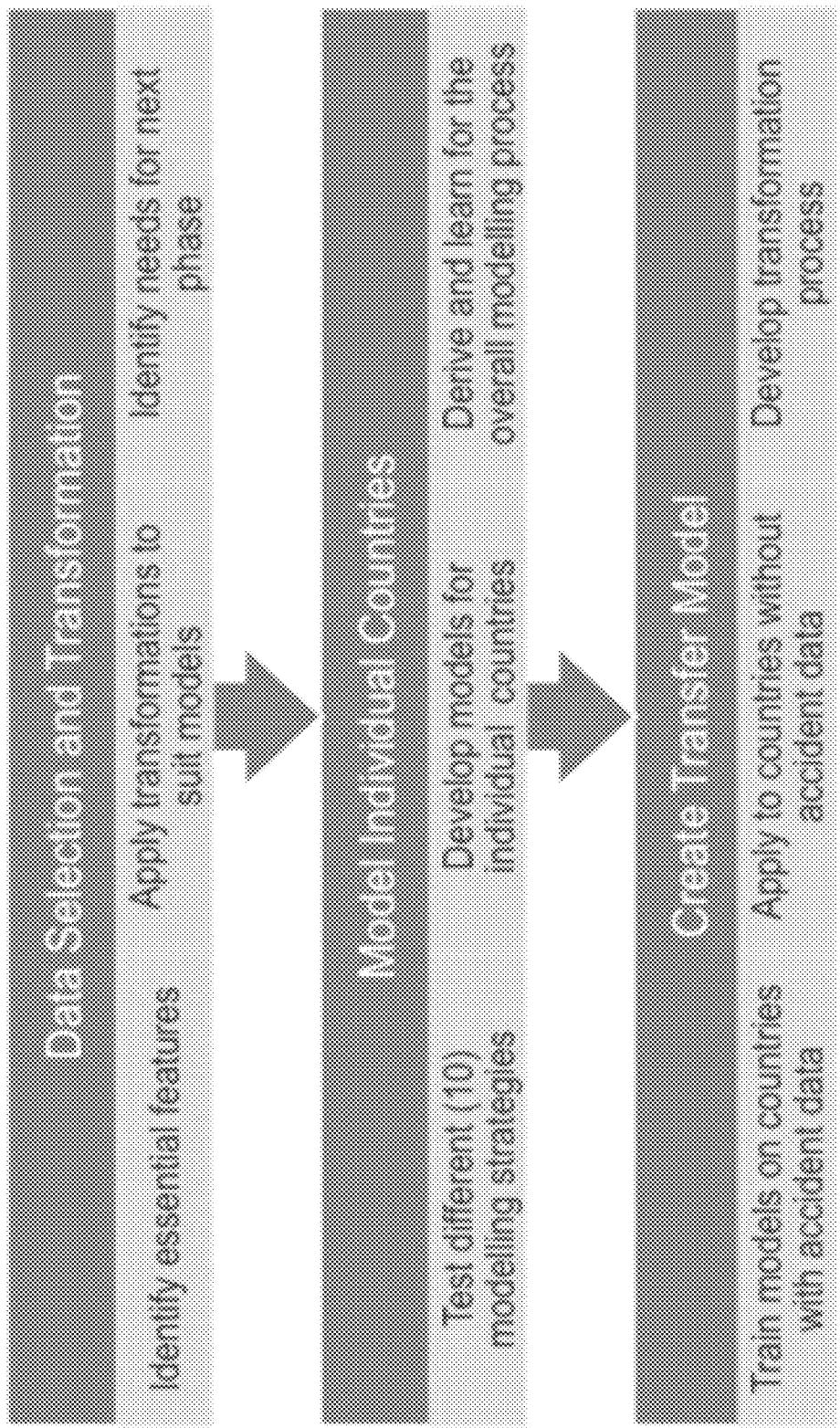

Finally, FIG. 17 shows a block diagram, which schematically illustrates the automated data processing by generating and determining the associated traffic risks and traffic risk maps, comprising the steps of (i) data selection and transformation, (ii) modeling of the individual countries, and (iii) creating the transfer modeling.

FIG. 1 schematically illustrates an architecture for a possible implementation of an embodiment of the system 1 wherein automated location-dependent forecasting of absolute and relative risks for car accidents based on exclusively non-insurance related data is realized. Using the system, data records of accident events are generated and location-dependent probability values for specific accident conditions associated with the risk of car accident are determined.

A spatial high-resolution grid 212 with grid cells 2121, 2122, 2123, 2124 is generated over a geographical area 21 of interest by means of a capturing unit 2, as illustrated by FIGS. 2 and 3. The geographical area 21 includes at least a portion of units 70-74 exposed to accident risks. The grid cells 2121, 2122, 2123, 2124 of the grid 212 are selectable and data are assignable via the system to each cell 2121, 2122, 2123, 2124 of the grid 212, and data records representative of a grid cell are assigned to a year of occurrence or measurement and are saved in a memory module of a calculating unit. The generation of the location and resolution of datasets is shown by FIGS. 2 and 3. These figures show, as an example, the data extraction and grid generation for the exemplary countries China, Germany, India, and Turkey. The resolution can be adapted to dynamic triggered levels, e.g., municipality and district grids: 2*2, 4*4, 10*10, 15*15 km grids. However, the grids also can be chosen otherwise, e.g. depending on the available data. An appropriate quadtree data structure can be generated by means of the system 1 and associated with the processing steps by the system 1 from the population density parameters.

For each grid cell 2121, 2122, 2123, 2124, an ambient population density parameter is captured by means of a settlement pattern trigger 40 and assigned to a generated data record assigned to the corresponding grid cells 2121, 2122, 2123, 2124. Population density parameters are captured for the geographical area 21 of interest and customized weighting factors are assigned in said spatial high-resolution grid 212 accounting for the diverse settlement patterns. In relation to the used population raster, the population raster can e.g. be mainly model-based on UN statistics and local governmental data on administrative units, wherein appropriate algorithm can be used to estimate the corresponding grid densities. The raster format can be used for simple data integration and no actual "imagery" needs to be used. In another embodiment variant, the population density parameter can for example be extracted by means of the system 1 from aerial high-resolution data 401, as shown in FIG. 4, for instance comprising aerial images and/or satellite images and/or aerophotos. In general for the use of aerial high-resolution data 401, 411, 412, 414, 415 of the present invention, the aerial high-resolution data 401, 411, 412, 414, 415 can comprise aerial images and/or satellite images and/or aerophotos measured by satellite and/or aircraft and/or aerostat or other measuring stations equipped with a balloon.

The extraction of the population density parameters can be based on measured interaction between population density parameters and/or land use parameters and driving or traffic patterns. To perform the extraction using the system 1, the system 1 can comprise variables that measure the interaction of land use and travel behavior, i.e., traffic patterns. However, for the extraction, population density is the primary quantifiable land use descriptor variable. Population density parameters can be further used by the system 1 to isolate area types (urban, second city, suburban, town and rural). Other variables that can relate to quantifying land use, including residential density and work tract employment density parameters, can also be comprised by the system 1. Further parameters and characteristics of the population or built environment such as race, age, income, and retail employment can further be used to weight land use impacts across different population groups. For the extraction, greater population density can for example be associated with decreasing annual miles driven, greater bus availability, decreased dependency on single occupancy vehicles and increased use of transit. The private automobile is still the dominant mode of travel for most geographical areas 21, although African Americans, Asians and Hispanics are in general more likely to use other modes of transportation. Increasing population density is typically associated with fewer person trips, fewer person miles traveled, and fewer person miles per trip. Residents of densely populated areas report the fewest vehicle trips, vehicle miles traveled, and vehicle miles per trip. Less densely populated areas tend to have more drivers per adult and more vehicles per adult.

For the determination of the customized weighting factors, the mentioned second cities tend to follow national averages with regard to several transportation parameters, for example, drivers per adult, vehicles per adult, percentage of persons working from home, and auto-dependency. Approximately 20% of second city residents go to work by a mode other than private automobile. Residents of smaller cities report the highest number of person trips of any area type. Persons in suburban areas make the next highest number of person trips. Typically a high number of low-income residents live in second cities, which have limited transit availability. For the extraction, the system 1 can for example also identify locational preferences of specific segments of the population. High-income households generally tend to be located in suburban areas, while middle-income households are most often found in rural areas. Low-income households are generally found in urban or rural areas. Distance to work and travel time to work decrease as the percentage of retail trade in an area increases. Urban areas have the smallest percentage of residents working in census tracts with over 25% participation in retail trade. Second cities have the highest percentage with 28.8% of residents working, where more than 25% of jobs are in retail trade. Retail employment and employment density at the work census tract have some measurable correlations to travel behavior. At the home block group, increasing housing density is associated with greater transit availability and closer proximity to transit. Bicycle and walking trips increase as residential density increases. Increasing residential density is also associated with increasing employment density. At residential densities between 100 and 1,499 housing units per square mile, people are less likely to work at jobs with no fixed workplace. Low residential density areas have the largest percentage of people working at home.

Thus, in summary, residential density parameters, retail employment, income, area type, and population density parameters all provide important descriptors for transportation behavior and policy implementation and are related to linking land use to transportation choices and behavior, wherein the data extraction by the system 1 for the ambient population density parameter and the customized weighting factors is based upon said measured variables.

As FIG. 5 illustrates, the system 1 provides image processing of first aerial high-resolution data 411, i.e., satellite images of land cover data, measured by first air-based measuring stations 41. The first aerial high-resolution data 411 are transferred to the system 1 and land cover parameters are generated by means of system 1, i.e., the system 1 generates defined areas of forest, rural, urban, crop lands, etc. The land cover parameters are stored by means of the generated data record assigned to the corresponding grid cells 2121, 2122, 2123, 2124 based on said first aerial high-resolution data 411. The land cover parameters 4101, 4102, 4103, 4104 are a measure for the observable biophysical cover on the earth's surface. Traffic and mobility relates and increases as a result of demographic, economic, land use and international developments. It can be stated that traffic is not only related, but is a necessary condition for economic growth and social development. There are various measuring parameters related to the land cover parameters, e.g., the construction of relevant infrastructures, traffic management measures (e.g., ramp metering, route guidance), land use policy (e.g., compact city) and measures that try to influence travel behavior (e.g., road pricing). The appropriate measures can be selected by weighting their influence on their dependency to the functioning of the traffic system, i.e., a traffic analysis, for example based on historical traffic data. The traffic analysis process can provide the necessary understanding of the relationship between the functioning of the traffic system and the underlying phenomena. The process can for example consist of examining historical traffic data, as mentioned. For the analysis, the traffic analysis process can be applied to the traffic situation on an average day (Annual Average Daily Traffic: AADT) or an average working day (Annual Average Weekday Traffic: AAWT) and with the Design Hour Volume (DHV). In a second step, the time grid size can be refined. Typically, the traffic pattern is related to travel demand and traffic supply characteristics. Travel demand is defined as the number of vehicles or people that wish to travel past a point during a specified period. The main traffic supply characteristic that influences traffic pattern dynamics is capacity. Capacity is defined as the maximum number of vehicles or persons that can reasonably be expected to be served in the given time period. Traffic management also measures the influence dynamics of traffic patterns. In some cases, traffic management allows a more effective use of the available capacity (direct influence). Moreover, in some cases, capacity is increased or decreased or certain trips are stimulated or discouraged, for example by means of road pricing (indirect influence). Both travel demand and the capacity of a road vary in time and space and are influenced by further external factors. Traffic is a derived demand, caused by the need or desire to employ activities at certain locations (e.g., living, working, shopping, recreation). Most variations in travel demand are due to the distribution of activities over time and space. Additionally, travel demand may vary as a result of changes in modal split, route choice or departure time due to external factors, past experiences or provided information. The capacity of a road obviously depends on the road design and regulations (e.g., maximum speed). Regarding temporal variations, on the urban network, the instantaneous capacity is highly influenced by traffic light cycles, where the capacity is zero in case of a red light. Additionally, the weather, road works, accidents and incidents may cause the capacity to vary over time. The factors, as discussed, and the interaction between them cause the traffic pattern to vary in time and space. Regarding temporal variations, different time scales can be distinguished, varying from minute-to-minute to year-to-year variations. The driving forces behind the variations differ by time scale. Short-term variations in urban traffic are mainly due to traffic light cycles. Hour-to-hour and day-to-day variations are mainly caused by variations in travel demand, although variations in capacity (for example, due to weather or road works) may also play a role. Long-term variations in traffic are mainly due to long-term demographic, economic and infrastructural developments.

Both the travel demand and supply characteristics of urban areas clearly differ from those of highways. Therefore, an analysis of highway traffic patterns and associated dynamics cannot be directly translated to the urban situation. One difference between urban traffic and highway traffic is that on the urban road network, multiple traffic modes coexist and interact—for instance pedestrians, bicycles, cars, buses, trucks—whereas highways are mainly used by cars and trucks. This mixture of modes also causes relatively large differences in speed between urban road users. Another characteristic of the urban network is that it contains many intersections. As a result, the traffic pattern in urban areas is characterized by many small disturbances, in comparison to highway traffic patterns, which in general show fewer disturbances yet with a higher impact. Regarding travel demand characteristics, traffic on the urban network is generally more diverse than traffic on highways. First of all, depending on the type of highway, a highway mainly serves medium- or long-distance traffic. The urban network also serves medium- and long-distance traffic to and from the highways, yet also a considerable amount of local or short-distance traffic. Also, the distribution over travel motives is more diverse for urban traffic. Most highways are used for one main travel motive. In general, during working day peak periods, the main travel motives are work and business. Moreover, some highways show peaks on weekend days and during holiday periods caused by leisure traffic, for example to and from the beach. Also, most urban roads serve a considerable amount of work- and business-related traffic on working days. However, besides commuter traffic, shopping and leisure traffic also use the urban network extensively on working days.

As mentioned, the dynamic of the traffic pattern and characteristics of urban areas clearly differ from those of highways. The difference between the characteristics of the different areas can be measured by parameters, e.g., for the urban traffic pattern with indicators such as traffic volume, speed, queue length, delay and travel time. In that sense, the transfer of the first aerial high-resolution data 411 to the system 1 and the generation of the land cover parameters via the system 1, i.e., the detection of the defined areas of forest, rural, urban, crop lands, etc., is essential to the system 1.

As one alternative embodiment, system 1 can for example access aerial high-resolution data 411 from the European Space Agency (ESA). The ESA satellites produce global land cover maps at 300 m spatial resolution, which can be sufficient for the present use. The ESA high-resolution map data are produced using a multi-year and multi-sensor strategy in order to make use of all suitable data and maximize product consistency.

As FIG. 6 illustrates, second air-based measuring stations capture second high-resolution data 421 measuring light densities. The second high-resolution data 421 are transferred to the system 1. Nighttime light parameters are generated via the system 1 and stored by means of the generated data record assigned to the corresponding grid cells 2121, 2122, 2123, 2124 based on said second aerial high-resolution data 421 on light density. Said nighttime light parameters are generated based on their weighted proxy for local activity and correlation to other welfare proxy measures. The weighted proxy for other welfare proxy measures can for example comprise highly localized human well-being measures and/or national or sub-national Gross Domestic Product (GDP). The GDP or the Gross Domestic Product per capita are typically such measures of national and human well-being around the globe, wherein the nighttime light values give a proxy measure of Human Well-Being, such as GDP. However, the correlation of the other welfare proxy measures, such as the GDP, and the traffic pattern of the region should be considered only in their typically limited correlation. For instance, the GDP provides a good measure for the total economic activity, but not for the local distribution of that activity.

As an alternative embodiment, the second high-resolution data 421 can be based on satellite imagery from the U.S. Defense Meteorological Satellite Program and/or other sources. Generally, more lights and higher light intensity on a satellite image, e.g., measured in pixels per square kilometer, correlate with higher levels of development. This correlation can for example be illustrated by FIG. 6, showing North Korea and South Korea, wherein North Korea is almost a black area while South Korea is ablaze with light. However, also other comparisons can illustrate the correlation, such as the comparison between a brightly lit Tokyo and the center of Africa. One of the advantages of using satellite measuring data is that satellite provides data more immediately than on-the-ground survey measuring units of well-being, wherein the latter can take years. Therefore, satellite measuring data are more appropriate to cope with the dynamics of traffic pattern. Although a square kilometer is typically about the highest resolution accessible to second high-resolution data 421 to measure light output, newer satellites' measuring data, e.g., data from the National Polar Orbiting Partnership between NASA and NOAA, provide higher resolution imagery and may be more advantageous in connection with the realization of the present invention and system 1.

Third high-resolution data 431 are captured by systematically performing ground survey measuring stations 43 and are transferred to the system 1. Based upon the third high-resolution data 431 of the ground survey measuring stations 43, road map parameters are generated and stored by means of the generated data record assigned to the corresponding grid cells 2121, 2122, 2123, 2124. The road map parameters comprise at least one classification parameter indicating a type of the assigned road. The third high-resolution data 431 can for example be selected by means of a data extraction from an accessible high-resolution road map database. The ground survey measuring stations 43 can for example comprise a global positioning unit (GPS) or are traceable by satellite imagery. The classification parameters of the road map parameters can for example comprise values to classify cycleways, footways, motorways, paths, pedestrians, primary roads, residential roads, secondary roads, steps, services, tertiary roads tracks and/or unclassifiable street objects. Furthermore, the classification parameters comprise tag elements allowing for attributes of the classification. The classification parameters can also comprise a measure for an average speed of a traffic member at the specific point of the grid cell 2121, 2122, 2123, 2124.

FIG. 7 schematically illustrates the data extraction from map data, road type, length and characteristics, e.g., highways, primary roads, trunk roads, pedestrian roads, etc., road junctions, one ways, tunnels, bridges and speed limits. The dynamically adapted map data can be based on measuring devices associated with system 1. However, it can also be based on accessing dedicated high-resolution map data, such as OpenStreetMap (OSM) data resources. The aforementioned OSM data example performs data capturing dynamically with a huge number of independent users (currently over 2 million) collecting data using manual survey, GPS devices, aerial photography, and other free sources. Thus, the ground survey measuring stations 43 can comprise systematic ground surveys using devices and measuring stations such as a handheld GPS unit, a notebook, a digital camera, or a voice recorder. However, the third high-resolution data 431 can also be accomplished by aerial photography, satellite imaginary and data from other sources that has added important sources of data, and automatically imported in the third high-resolution data 431. Special processes can for example be put in place to handle automated imports and avoid technical problems. In the example of the OSM, the data are structured as crowd-sourced data accessible under open database access.

Map data of the third high-resolution data 431 are usually collected using a GPS unit, although this is not strictly necessary if an area has already been traced from satellite imagery. Once the third high-resolution data 431 has been collected, it is entered into a data store. At that beginning, no information about the kind of transferred track is available, i.e., it could for example be a motorway, a footpath, or a river. Thus, in a second step, identification of the tracks and object is done in an automated or semi-automated way. In particular, the identification process comprises placing and editing objects such as schools, hospitals, taxi ranks, bus stops, pubs, etc. which can for example be done by an expert recognition system. As an alternative embodiment, the third high-resolution data 431 entered into said data store can for example use a topological data structure, with some core elements. Such core elements can for example comprise nodes. Nodes are points with a geographic position, stored as coordinates (pairs of a latitude and a longitude). Outside of their usage in these ways, they can be used to represent map features without a size, such as points of interest or mountain peaks. Ways are a further possible core element. Ways can be defined as ordered lists of nodes, representing a polyline, or possibly a polygon if they form a closed loop. They can be used both for representing linear features, such as streets and rivers, and areas, such as forests, parks, parking areas and lakes. Furthermore, the core elements can comprise relations. Relations are ordered lists of nodes, ways and relations, where each member (relations and ways) can optionally have a "role" (a string). Relations are used for representing the relationship of existing nodes and ways. Examples include turn restrictions on roads, routes that span several existing ways (for instance, a long-distance motorway), and areas with holes. Finally, the core elements can comprise tags. Tags can be key-value pairs (both arbitrary strings). They can be used to store metadata about the map objects (such as their type, their name and their physical properties). Typically, tags are not free-standing, but are always attached to an object, i.e., to a node, a way or a relation.

Fourth aerial high-resolution data 441 are measured by space-based and/or air-based measuring stations 44, and are transferred to the system 1. In addition, measuring data from ground-based measuring stations can be used. Based upon the fourth aerial high-resolution data 441 and/or ground-based data, precipitation parameters are generated and stored by means of the generated data record, which are assigned to the corresponding grid cells 2121, 2122, 2123, 2124 based on said fourth aerial high-resolution data 441. The generated precipitation parameters comprise a measure of the hydrological cycle giving at least the local precipitation's distribution, amounts and intensity at a specific point or area of the corresponding grid cell 2121, 2122, 2123, 2124. The precipitation parameters can for example comprise at least parameters measuring the precipitation of rain and/or snow and/or hail. FIG. 8 illustrates such a generation and extraction of the precipitation parameters and image processing of the fourth aerial high-resolution data 441, e.g., satellite images of precipitation data, providing precipitation parameters for at least average yearly rainfall and total rainfall. Correlations between weather-related data and traffic patterns are known. However, they are typically known in connection with weather-related influences and delays in air traffic patterns, whereas the background of the correlation of weather-related influences and delays in air traffic patterns is completely different and mainly related to the concerned airports. Yet weather influences, for example represented by the aforementioned hydrological cycle, precipitation's distribution, amounts and intensity, affect the performance of the highway systems every day and hour. Rain, snow, ice and the like are partly or fully responsible for more than 1.5 million highway crashes and more than 600,000 injuries and 7,000 fatalities on U.S. roads every year.

Furthermore, in the U.S. alone, motorists lose about 1 billion hours a year stuck in traffic related to adverse weather. In fact, weather is the second leading cause of nonrecurring highway congestion, accounting for about 25 percent of delays. Studies have shown that adverse weather increases average travel times significantly, depending on the selected area, e.g., by 14 percent in the Washington, D.C., area and 21 percent in Seattle, Wash. During peak periods, travel time in Washington, D.C. can increase by as much as 24 percent in the presence of rain or snow. Despite the impacts of adverse weather on traffic patterns and transportation, prior art systems on traffic pattern recognition and forecasting typically do not consider the links between weather and traffic flow. Yet accurate and timely road and weather data are critical because they make it possible to manage infrastructure in real time in response to existing and impending weather conditions and to warn motorists about changes in weather and road conditions. Advancements in intelligent transportation systems (ITS), road weather information systems, weather and traffic data collection, and forecasting technologies should be based on a better understanding of how drivers behave in adverse weather and how their decisions affect traffic flow. Through the extraction and generation of the precipitation parameters based upon the fourth aerial high-resolution data 441, the present invention fully recognizes weather related correlation and does not have the drawbacks of the prior art systems. As an alternative embodiment, the present invention can further comprise means for real-time modification of traffic signal and ramp meter timing, operation of automated deicing systems, and setting of variable speed limits, allowing a broad application of the signaling of the system 1.

The fourth high-resolution data 441 can further comprise weather and traffic data from static and fixed devices such as video cameras, traffic counters, loop detectors, airport weather stations, and environmental sensor stations. However, the fourth high-resolution data 441 can also be captured, at least partially, by traffic and weather information provided by moving vehicles. Therefore, the present invention is able to consider the effects of adverse weather on macroscopic (aggregate) traffic flow and quantified changes in traffic speed, capacity, and density in correlation with the generated precipitation parameters. It bears note that the correlation of the precipitation parameters (rain or snow) with the traffic pattern does not necessarily have to affect the density of the traffic stream, but it affects traffic free-flow speed, speed-at-capacity, and capacity. Most of those parameters vary with precipitation intensity. Although capacity reductions of 12-20 percent occurred in snowy conditions, the reduction in capacity is normally not a function of the intensity of the snow (or rate of snowfall). It is also important to note that it can be advantageous to locally weight the precipitation parameters, since it has been observed that precipitation parameters can comprise strong geographical correlations. Observations show that in a first area (colder region), greater reductions occurred (e.g., around 20 percent) in traffic stream free-flow speed and speed-at-capacity in snow than another comparable area (e.g., around 5 percent in the warmer region). One possible explanation is that drivers who are more accustomed to snow are more aware of its dangers and slow down. Whatever the case may be, it can be advantageous, especially for traffic pattern estimation and prediction, for the local dependencies of the precipitation parameters to be considered by the system 1. Thus, the data processing used must be calibrated for a variety of local conditions and traffic patterns for implementation and evaluation, and even more so if the system 1 is used in the context of regional planning and operations. As an alternative embodiment, the fourth high-resolution data 441 can be accessed and transferred to the system 1 using the corresponding European Centre for Medium-Range Weather Forecasts (ECMWF) data.

Fifth aerial high-resolution data 451 are measured by fourth air-based measuring stations 45 and are transferred to the system 1. Digital elevation parameters are generated and stored by means of the generated data record assigned to the corresponding grid cells 2121, 2122, 2123, 2124 based on said fifth aerial high-resolution data 451. The digital elevation parameters can for example further comprise morphological elements.

FIG. 9 illustrates the generation and extraction of the digital elevation parameters and the image processing of fifth aerial high-resolution data 451, e.g., satellite images, wherein maximum elevation, standard deviation for elevation and mean elevation parameters are generated. The generated digital elevation parameters comprise a measure for the terrain elevation at a specific point or area of the corresponding grid cell 2121, 2122, 2123, 2124 providing a representation of the terrain's surface. The digital elevation parameters provide a digital representation of a terrain's surface created from terrain elevation data. In the present case, the digital elevation parameters represent the earth's surface, including all objects on it. This is for example in contrast to digital terrain parameters representing the bare ground surface without any objects, such as plants and/or buildings. The digital elevation parameters can represent the surface as a raster (a grid of squares, also known as a heightmap when representing elevation) or as a vector-based triangular irregular network (TIN). The system 1 can generate the digital elevation parameters in a number of ways, but using remote sensing or direct survey data. One technique for generating the digital elevation parameters is for example interferometric synthetic aperture radar, where two passes of a radar satellite, or a single pass if the satellite is equipped with two antennas, collect sufficient data to generate the digital elevation map or parameters tens of kilometers on a side with a resolution of around ten meters. Other kinds of stereoscopic pairs can be employed using the digital image correlation method, where two optical images are acquired with different angles taken from the same pass of an airplane or an earth observation satellite. Other methods of generating the digital elevation parameters can for example involve interpolating digital contour maps that may have been produced by direct survey of the land surface. This method is especially useful in mountain areas, where interferometry is not always satisfactory. Note that the digital elevation parameters imply that elevation is available continuously at each location in the study area. The quality of the digital elevation parameters is correlated to how accurate the elevation is at each pixel (absolute accuracy) and how accurately the morphology is presented (relative accuracy). Several factors play an important role for the quality of the digital elevation parameters, such as terrain roughness, sampling density (elevation data collection method), grid resolution or pixel size, interpolation algorithm, vertical resolution, terrain analysis algorithm, quality masks concerning information on the coastline, lake, snow, clouds, correlation etc. As an alternative embodiment, the fifth aerial high-resolution data 451 and/or the applied digital elevation model can be accessed by the data provided by the U.S. National Aeronautics and Space Administration (NASA).

The system 1 comprises a trigger module 3 with a hash table 31 with a plurality of selectable morphological traffic model-functions 311, 312, 313, etc. For each grid cell 2121, 2122, 2123, 2124, the generated data records are filtered by predefined trigger parameters 321, 322, 323, etc. triggering threshold values of the generated population density parameters, the land cover parameters, the nighttime light parameters, the road map parameters, the precipitation parameters, and the digital elevation parameters. The morphological traffic model-functions 311, 312, 313, etc. are matched by means of a scaling table 33 based on captured actual accident data 331. A specific morphological traffic model-function 311, 312, 313, etc. is triggered and selected by best matching to the accident data 331.

A risk-value field 50 for each of the grid cells 2121, 2122, 2123, 2124 is generated 51 by means of an interpolation module 5 based on the data records associated with the specific grid cell 2121, 2122, 2123, 2124, and a probability 521 is assigned by means 52 of the interpolation module 5 to each point in said grid 212, giving the probability of the occurrence of a accident at a given geographical location and time.

REFERENCE LIST

1 System for determination of absolute and relative risks for car accidents
2 Capturing unit
   21 Geographical area
      212 Spatial high-resolution grid
         2121, 2122, 2123, 2124 Grid cells 3 Trigger module
   30 Morphological function store
   31 Hash table
      311, 312, 313, etc. Selectable morphological traffic model-function
   32 Trigger parameter table
      321, 322, 323, etc. Trigger parameters with threshold values
   33 Scaling table
      331 Captured actual accident data
40 Pattern trigger
   401 High-resolution density data
41 First air-based measuring stations
   411 First high-resolution data
42 Second air-based measuring stations
   421 Second high-resolution data
43 Ground survey measuring stations
   431 Third high-resolution data
44 Third air-based measuring stations
   441 Fourth high-resolution data
45 Fourth air-based measuring stations
   451 Fifth high-resolution data
5 Interpolation module
6 Data transmission network
   61 Activation device
   62 Alarm device
   63 Mobile access device
   64 Input/output device

The invention claimed is:

1. A measuring system for automated location-dependent forecast of absolute and relative risks for car accidents, wherein data records of accident events are generated and location dependent probability values for specific accident conditions associated with the risk of car accident are determined, comprising:
   at least one processor configured to:
   forecast the absolute and relative risks for the car accidents based on exclusively non-insurance related data including:
      generate a spatial high-resolution grid with grid cells over a geographical area of interest, said geographical area of interest including at least a portion of units exposed to accident risks, wherein the grid cells are selectable and data is assignable to the grid cells,
      save data records representative of a grid cell assigned to a year of occurrence or measurement,
      assign a population density parameter captured by a settlement pattern trigger for each of the grid cells to a corresponding data record, wherein the population density parameters are captured for the geographical area of interest and customized weighting factors accounting for diverse settlement patterns are assigned in said spatial high-resolution grid,
      receive first aerial high-resolution data captured by first air-based measuring stations,
      generate land cover parameters for each of the grid cells based on said first aerial high-resolution data, wherein the land cover parameters are a measure for an observable bio-physical cover on the earth's surface,
      store the land cover parameters to the corresponding data records,
      receive second aerial high-resolution data on light density captured by second air-based measuring stations comprising at least one of aerial images and satellite images as satellite measuring data,
      generate nighttime light parameters for each of the grid cells based on said second aerial high-resolution data on light density, wherein said nighttime light parameters are generated based on their weighted proxy for local activity and correlation to other welfare proxy measures,
      store the nighttime light parameters to the corresponding data records,
      receive third high-resolution data captured by ground survey measuring stations,
      generate road map parameters for each of the grid cells based on said third high-resolution data of the ground survey measuring stations, wherein the road map parameters comprise at least one classification parameter indicating a type of an assigned road,
      store the road map parameters to the corresponding data records,
      receive fourth aerial high-resolution data captured by air-based measuring stations,
      generate precipitation parameters for each of the grid cells based on said fourth aerial high-resolution data, wherein the precipitation parameters comprise a measure of a hydrological cycle giving at least local precipitation distribution, amount, and intensity at a specific point or area of the corresponding grid cell,
      store the precipitation parameters to the corresponding data records,
      receive fifth aerial high-resolution data measured by fourth air-based measuring stations,
      generate digital elevation parameters for each of the grid cells based on said fifth aerial high-resolution data, wherein the digital elevation parameters comprise a measure for a terrain elevation at the specific point or the area of the corresponding grid cell providing a representation of a terrain's surface,
      store the digital elevation parameters to the corresponding data records,
      filter the data records by predefined trigger parameters triggering threshold values of the population density parameters, the land cover parameters, the nighttime light parameters, the road map parameters, precipitation parameters, and the digital elevation parameters,
      match a plurality of morphological traffic model-functions by a scaling table based on captured actual accident data,
      trigger and select a specific morphological traffic model-function by best matching to the captured actual accident data,
      generate a risk-value field for each of the grid cells based on the data records, and
      assign a probability to each point in said grid giving a probability of an occurrence of an accident at a given geographical location and time.

2. The system according to claim 1, wherein the aerial high-resolution data comprises at least one of aerial images, satellite images, and aerophotos.

3. The system according to claim 1, wherein the aerial high-resolution data is measured by at least one of a satellite an aircraft an aerostat, and another measuring station equipped with a balloon.

4. The system according to claim 1, wherein the weighted proxy comprises at least one of highly localized human well-being measures, national Gross Domestic Product (GDP), and sub-national GDP.

5. The system according to claim 1, wherein the third high-resolution data are selected from an accessible high-resolution road map database.

6. The system according to claim 1, wherein the ground survey measuring stations comprise a global positioning unit (GPS) or are traceable by satellite imagery.

7. The system according to claim 1, wherein the at least one classification parameter comprises at least one of values to classify cycleways, footways, motorways, paths, pedestrians, primary roads, residential roads, secondary roads, steps, services, tertiary roads tracks, and unclassifiable street objects.

8. The system according to claim 7, wherein the at least one classification parameter comprises a tag element allowing for attributes of the classification.

9. The system according to claim 1, wherein the at least one classification parameter comprises a measure for an average speed of a traffic member at the specific point of the corresponding grid cell.

10. The system according to claim 1, wherein the precipitation parameters comprise at least parameters measuring precipitation of at least one of rain, snow, and hail.

11. The system according to claim 1, wherein the digital elevation parameters comprise morphological elements.

12. A measuring method for automated location-dependent forecasting of absolute and relative risks for car accidents, wherein data records of accident events are generated and location-dependent probability values for specific accident conditions associated with the risk of car accident are determined, the method comprising:
forecasting the absolute and relative risks for the car accidents based on exclusively non-insurance related data including:
generating a spatial high-resolution grid with grid cells over a geographical area of interest, said geographical area of interest including at least a portion of units exposed to accident risks, wherein the grid cells are selectable and data is assignable to the grid cells,
saving data records representative of a grid cell assigned to a year of occurrence or measurement,
assigning a population density parameter for each of the grid cells to a corresponding data record, wherein the population density parameters are captured for the geographical area of interest and customized weighting factors accounting for diverse settlement patterns are assigned in said spatial high-resolution grid,
receiving first aerial high-resolution data,
generating land cover parameters for each of the grid cells based on said first aerial high-resolution data, wherein the land cover parameters are a measure for an observable bio-physical cover on the earth's surface,
storing the land cover parameters to the corresponding data records,
receiving second aerial high-resolution data on light density comprising at least one of aerial images and satellite images as satellite measuring data,
generating nighttime light parameters for each of the grid cells based on said second aerial high-resolution data on light density, wherein said nighttime light parameters are generated based on their weighted proxy for local activity and correlation to other welfare proxy measures,
storing the nighttime light parameters to the corresponding data records,
receiving third high-resolution data,
generating road map parameters for each of the grid cells based on said third high-resolution data of the ground survey measuring stations, wherein the road map parameters comprise at least one classification parameter indicating a type of an assigned road,
storing the road map parameters to the corresponding data records,
receiving fourth aerial high-resolution data,
generating precipitation parameters for each of the grid cells based on said fourth aerial high-resolution data, wherein the precipitation parameters comprise a measure of a hydrological cycle giving at least local precipitation distribution, amount, and intensity at a specific point or area of the corresponding grid cell,
storing the precipitation parameters to the corresponding data records,
receiving fifth aerial high-resolution data,
generating digital elevation parameters for each of the grid cells based on said fifth aerial high-resolution data, wherein the digital elevation parameters comprise a measure for a terrain elevation at the specific point or the area of the corresponding grid cell providing a representation of a terrain's surface,
storing the digital elevation parameters to the corresponding data records,
filtering the data records by predefined trigger parameters triggering threshold values of the population density parameters, the land cover parameters, the nighttime light parameters, the road map parameters, precipitation parameters, and the digital elevation parameters,
matching a plurality of morphological traffic model-functions by a scaling table based on captured actual accident data,
triggering and selecting a specific morphological traffic model-function by best matching to the captured actual accident data,
generating a risk-value field for each of the grid cells based on the data records, and
assigning a probability to each point in said grid giving a probability of an occurrence of an accident at a given geographical location and time.

13. The method according to claim 12, wherein the aerial high-resolution data comprises at least one of aerial images, satellite images, and aerophotos.

14. The method according to claim 12, wherein the weighted proxy comprises at least one of highly localized human well-being measures, national Gross Domestic Product (GDP), and sub-national GDP.

15. The method according to claim 12, wherein the at least one classification parameter comprises at least one of values to classify cycleways, footways, motorways, paths, pedestrians, primary roads, residential roads, secondary roads, steps, services, tertiary roads tracks, and unclassifiable street objects.

16. The method according to claim 15, wherein the at least one classification parameter comprises a tag element allowing for attributes of the classification.

17. The method according to claim 12, wherein the at least one classification parameter comprises a measure for an average speed of a traffic member at the specific point of the corresponding grid cell.

18. The method according to claim 12, wherein the precipitation parameters comprise at least parameters measuring precipitation of at least one of rain, snow, and hail.

19. The method according to claim 12, wherein the digital elevation parameters comprise morphological elements.

\* \* \* \* \*